United States Patent [19]
Radziewicz et al.

[11] Patent Number: 5,854,897
[45] Date of Patent: Dec. 29, 1998

[54] NETWORK COMMUNICATIONS MARKETING SYSTEM

[75] Inventors: Clifford J. Radziewicz, Belle Mead; Mark R. Gregorek, Mahwah; Jeffrey C. Dillow, Sparta, all of N.J.

[73] Assignee: Quantum Systems, Inc., Ramsey, N.J.

[21] Appl. No.: 774,985

[22] Filed: Dec. 27, 1996

[51] Int. Cl.$^6$ .................................................... G06F 15/16
[52] U.S. Cl. ............................. 395/200.54; 395/200.47; 395/762
[58] Field of Search .................. 395/200.31, 200.47, 395/200.54, 200.33, 762, 776, 786

[56] References Cited

U.S. PATENT DOCUMENTS

| | | | |
|---|---|---|---|
| 5,451,839 | 9/1995 | Rappaport et al. | 375/224 |
| 5,530,852 | 6/1996 | Meske, Jr. et al. | 395/600 |
| 5,572,643 | 11/1996 | Judson | 395/793 |
| 5,717,860 | 2/1998 | Graber et al. | 395/200.12 |
| 5,724,424 | 3/1998 | Gifford | 380/24 |
| 5,737,619 | 4/1998 | Judson | 395/761 |

OTHER PUBLICATIONS

Elliott, "Advertising. Juno Would be Delighted to Handle Your E-mail Free, but She Would Like Something in Return", *The New York Times*, Apr. 22, 1996, p. D11.
Verity, "Free E-mail, but With a Catch", *Business Week*, Apr. 29, 1996, p. 8.

*Primary Examiner*—Mehmet B. Geckil
*Attorney, Agent, or Firm*—Panitch Schwarze Jacobs & Nadel, P.C.

[57] ABSTRACT

A communications marketing system allows a client station accessing a computer network through a Network Service Provider (NSP) to receive advertisements whenever the connection path between the client station and the NSP is idle. The NSP monitors traffic to/from the client station to determine when the connection path is idle. An announcement server connected to the NSP transmits advertising messages and other information to the client station when the connection path is idle. The advertisements are displayed in a predetermined location of a browser client window of the client station. The advertisements can be played/displayed for a predetermined time period.

71 Claims, 28 Drawing Sheets

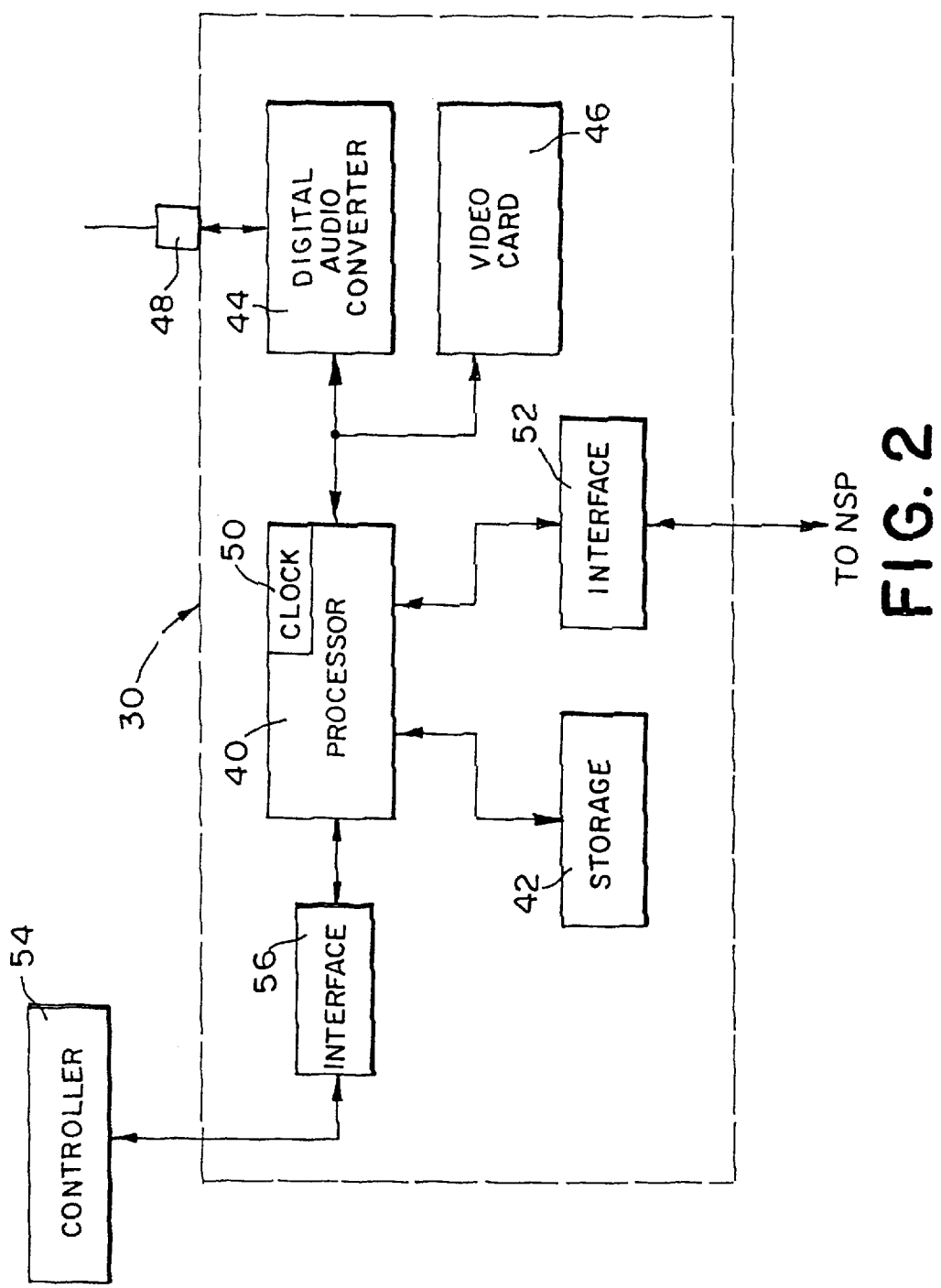

NETWORK COMMUNICATIONS MARKETING SYSTEM

FIELD OF THE INVENTION

The present invention relates to a communications system and, more particularly, to a communications system for transmitting messages over a communications medium while a connection path to a device is idle and displaying the messages in a display window of the device.

BACKGROUND OF THE INVENTION

Most conventional communications networks today, such as computer networks, provide a status message to a party or station when that party or station is waiting for an event to occur, such as a connection to a remote network station to be established or information, for example from a search request, to be provided to it. During many such network communications between network devices connected to the network, for instance, a connection between a network terminating station device and a video server, network service provider, or remote computing device, there are often periods during the communication when one party or device needs to process information or process a request. That is, there is no transmission activity on the line, leaving both idle line time and idle processing time.

Many users at a network terminating device or station become frustrated when encountering a "busy" or "wait" condition, since it is unknown how long the line or remote computer or device will be busy, and when a connection will be established or a service request completed. Many parties at stations become frustrated when encountering a status message (e.g., "processing" or "waiting for a connection" or "downloading data"). The time that a user and/or the user's station equipment waits for a connection to be established or re-established, waits for a busy condition to clear, or waits for information to be downloaded, normally represents wasted time and unnecessarily occupies network equipment and user time without generating network income.

It would be beneficial to be able to productively occupy the time that the user and/or the calling station equipment is connected to a network service provider, but idle, without annoying the user by requiring the user to view a nearly meaningless status message, or wait idly while the other station processes information. The foregoing scenario holds true whether the user is attempting to complete a connection to a remote host computer or other device or receive information, for instance from a search request.

It would be advantageous to have a communications system which would fill idle line time with a series of pre-recorded announcements which would provide the waiting user with useful information. When the device at the called network address or station line is answered or is responding to the waiting user, the transmission of announcements would discontinue and the connection would be completed in the usual manner. In addition, the announcements would be discontinued if the user abandons the communication or attempted communication. The announcements could comprise a custom audio/video/graphics/text message and menuing system which would allow the user to receive audio, visual, graphics and/or text announcements and interact with the network or make menu choices providing the user with useful information.

If the requested information is shipped in more than one 'burst', the announcement is provided before the initial burst, between bursts or even after the information transfer is complete. In addition, the announcements would be discontinued if the idle party abandons the communication or attempted communication.

The present invention is directed to a network communications marketing system which provides announcements to a station whenever the station or line connecting the station to a communications network is idle. The announcements can vary in subject matter. The announcements are provided until the station or line is no longer idle. At that time, the announcements are discontinued, suspended, or terminated, and may be restarted or reinitiated at a later time.

SUMMARY OF THE INVENTION

Briefly stated, the present invention provides a marketing system for displaying an announcement at a network terminating device connected to a communications network by way of a network service provider (NSP). preferably, the marketing system comprises:

a browser client program including a display window executing on the network terminating device for allowing the network terminating device to communicate with other devices on the communications network, the NSP providing the network terminating device access to the communications network;

a network server program operating on the NSP for handling communications with the network terminating device and other devices on the communications network;

a connection path for connecting the network terminating device with the NSP and allowing communications therebetween;

a traffic monitor for monitoring the connection path to determine when the connection path is idle; and an announcement server connected to the NSP for transmitting at least one announcement to the network terminating device by way of the NSP, wherein the network server program transmits the at least one announcement from the announcement server to the network terminating device when the connection path is idle.

The present invention also provides a marketing system for displaying an announcement at a network terminating device connected to a communications network by way of a network service provider (NSP), the network terminating device connected to the NSP by a connection path and executing a browser client program including a display window, the system comprising:

an announcement server connected to the NSP, the announcement server including a storage device for storing at least one announcement;

a network server program operating on the NSP for handling communications between the network terminating device and the NSP and between the NSP and the communications network; and a traffic monitor for monitoring the connection path to determine when the connection path is idle, wherein the network server program notifies the announcement server to begin executing an announcement sequence, whereby the announcement server transmits the announcement over the connection path to the network terminating device when the connection path is idle.

Finally, the present invention provides a method for displaying an announcement at a network terminating device connected to a communications network by way of a network service provider (NSP). The method comprises the steps of:

providing a network server program operating on the NSP, the network server program handling communications between the network terminating device and the NSP and the NSP and the communications network;

providing an announcement server connected to the NSP and in communication with the network server program, the announcement server storing at least one announcement in a storage device thereof;

monitoring a connection path between the NSP and the network terminating device over which the network terminating device and the network server program communicate;

transmitting the announcement to the network terminating device when the connection path is idle; and displaying the announcement in a fixed announcement window on the network terminating device.

BRIEF DESCRIPTION OF THE SEVERAL VIEWS OF THE DRAWINGS

The foregoing summary, as well as the following detailed description of preferred embodiments, will be better understood when read in conjunction with the appended drawings. For the purpose of illustrating the invention, there are shown in the drawings embodiments which are presently preferred, it being understood, however, that the invention is not limited to the specific methods and instrumentalities disclosed. In the drawings:

FIG. 2 is a block diagram of a presently preferred embodiment of an advertising server in accordance with the present invention;

DETAILED DESCRIPTION OF THE INVENTION

Certain terminology is used in the following description for convenience only and is not meant to be limiting. The word "idle" means that a device connected to a computer or other network device by a transmission or communications medium is not presently sending or receiving any information over the transmission medium (e.g. no data packet is presently being transmitted over the communication medium to/from the device) and thus, the transmission or communications medium is idle. The term "connected" means that communication has been established between a device and a network service provider, thereby allowing the device access to other resources accessible by way of the network, but not necessarily that a line or path has been dedicated for the exclusive use of the device to communicate with the other devices accessible by way of the network. For instance, two devices which are connected by way of a communications network can pass data packets back and forth to each other with no two packets taking the same route or path over the network. Thus the devices are in communication, even though the two devices are not "connected" in the traditional sense by a single line or path. The terminology includes the words specifically mentioned, derivatives thereof and words of similar import.

Figure 1:
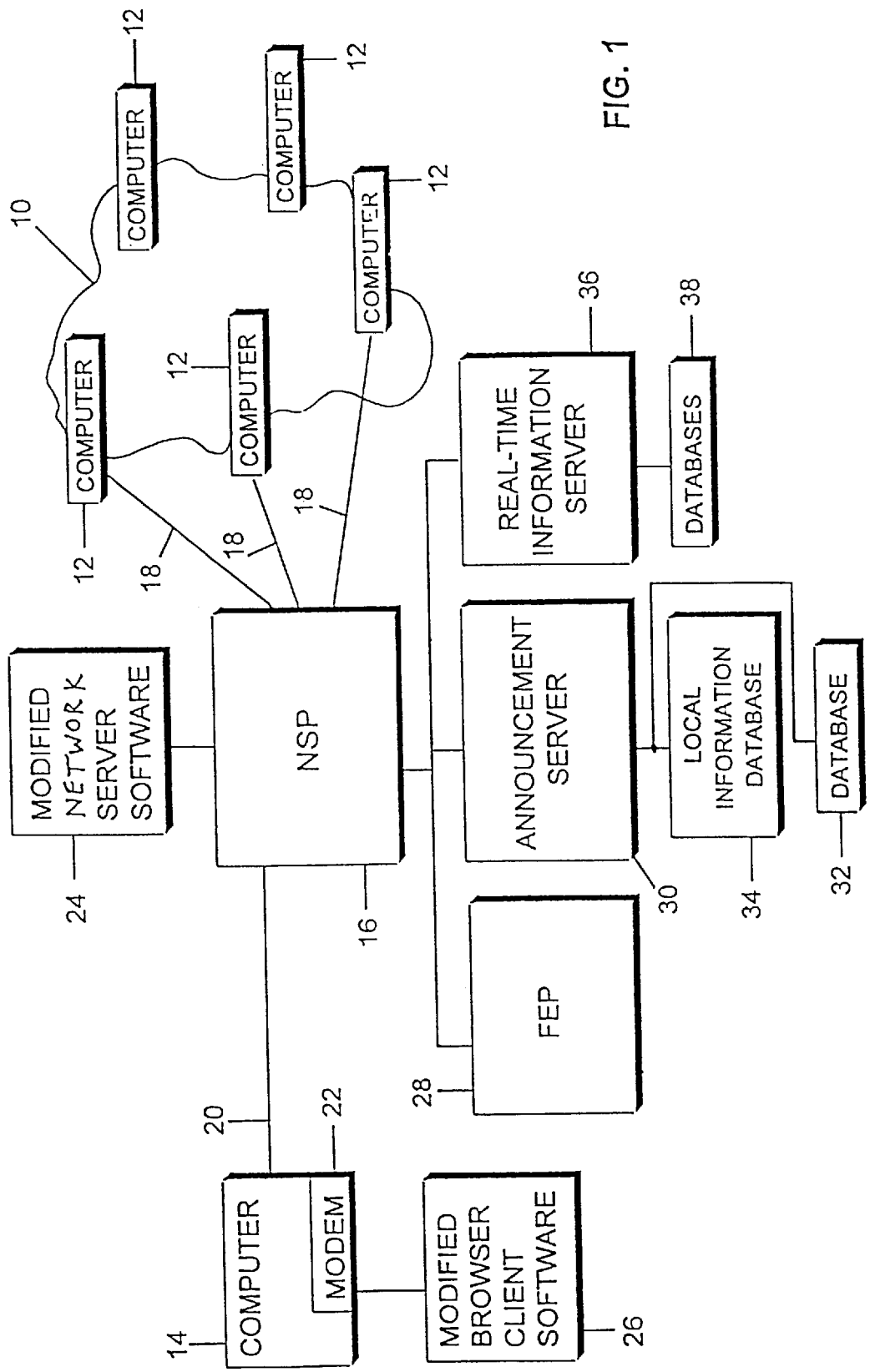
FIG. 1 is a block diagram of a presently preferred embodiment of a network communications system in accordance with the present invention.

Referring to the drawings, wherein like numerals indicate like elements throughout, there is shown in FIG. 1 a schematic block diagram of a decentralized computer network 10 including a network communications system in accordance with the present invention. The decentralized computer network 10 generally comprises a plurality of computers 12 which may communicate with each other over communications paths, as is known to those of ordinary skill in the art. An example of the decentralized computer network 10 is the Internet, which is a group of computer networks that communicate with each other by way of the communications paths. However, the computer network 10 may comprise a private local area network or wide area network if desired. The computers 12 may comprise any type of computer or network server, such as a mainframe computer, a midframe computer, a minicomputer, a network server, router, switch, a personal computer, a laptop computer, telephone, fax machine, or any other computing or communications device. As is known to those of ordinary skill in the art, the computers 12 may act as a host or node to which other computers may connect, or as a router for forwarding data packets between networks or computers. The communication paths may comprise any type of communication path capable of transmitting packets of information, such as voice, data, video, multimedia, real-time, store and forward, interactive, or hybrid types of information, in either analog or digital format in symmetrical or asymmetrical format, in packets, frames, cells, or in a continuous stream or in a virtual or dedicated connection, or in any hybrid arrangement. The communications paths may be provided by private or publicly owned local, local exchange, interexchange, long distance, international, telecommunications, cable television, broadcast, switched, dedicated or hybrid types of network providers utilizing wireless, facilities-based, satellite-based, or hybrid types of transmission schemes and/or mechanisms, including copper wire, coaxial cable, fiber-optic cables, microwave and radio towers or satellite dishes.

As is known to those of ordinary skill in the art, a network terminating device or data terminal equipment (DTE) 14 may be connected to one of the computers 12, by way of a Network Service Provider (NSP) 16 or, in the case of the Internet, by an Internet Service Provider (ISP). The NSP 16 is basically a computer including one or more means for communicating 18 to the computer network 10 and one or more communication paths 20 for allowing users to connect to the NSP 16. The means for communicating 18 may comprise any variety of communications means, such as an analog or digital telephone line, a coaxial cable, wireless communications means, or hybrid communications means. Such means are known to those of ordinary skill in the art and further description of such means is not required for a complete understanding of the present invention. Similarly, the connection path 20 to the DTE 14 may comprise any type of communications medium for connecting the DTE 14 to the NSP 16 which allows data to be passed therebetween, in either analog or digital form. The DTE 14 may communicate with the NSP 16 using a data communications equipment (DCE), such as a modem 22, as is known to those of ordinary skill in the art. Alternatively, the DTE 14 could be connected to the NSP 16 using a dedicated communications line or a digital communications line, such as an ISDN, HFC, DSL, or other type of access line provided by a local communications provider.

The DTE 14 may comprise a wide variety of devices for allowing a user to connect to the NSP 16. In the presently preferred embodiment, the DTE 14 comprises a personal computer. However, it should be clearly understood by those skilled in the art from this disclosure that the present invention is not limited to such standard network terminating devices and that the DTE 14, also referred to herein with the term "station", should be read to include but not be limited to devices such as televisions, video monitors, video telephones, telephones, computers, television set-top converters, video servers, front end processors, Internet appliances, fax machines, or other communications devices, and combinations or hybrids thereof connected via the computer network 10.

As is known to those of ordinary skill in the art, the DTE 14 may communicate with a computer 12 on the computer network 10 by way of the NSP 16 using browser client-server software, in which server software executes on the computer 12 and browser client software resides on the DTE 14. Generally, the server software executes user requests to the computers 12 on the computer network 10 made by the DTE 14, while the browser client software comprises a user-interface, receiving input and displaying information at the DTE 14. The NSP 16 routes communications between the computers 12 on the computer network 10 and the DTE 14, and performs any associated administrative functions, by using standard network server equipment and software. According to a first method of the present invention, the NSP 16 executes a modified network server software program 24 and the DTE 14 executes a modified browser client software program 26, as described in more detail below. The modified network server software 24 and the modified browser client software 26 allow announcements or messages, such as advertising messages, to be transmitted from the NSP 16 to the DTE 14 and played/displayed on the DTE 14.

The present invention allows messages, announcements or advertisements to be played or displayed on the DTE 14. In the presently preferred embodiment, such advertisements are transmitted to the DTE 14 whenever the connection path 20 is idle. A number of methods are described below for transmitting advertisements to the DTE 14 when the connection path 20 is idle. The present invention allows for any one of the following methods to be implemented, depending on how the DTE 14 interacts with the NSP 16. In a first method, the DTE 14 executes the modified browser client software 26 and the advertisements are transmitted to the DTE 14 whenever the connection path 20 is idle, with the DTE 14 displaying the advertisements in a fixed window of the browser display area. In a second method, the DTE 14 does not have the modified browser client software 26 and the NSP 16 includes a modified home page which allows the DTE 14 to communicate with other devices/computers on the computer network 10 through the modified home page of the NSP 16. The advertisements are displayed in a fixed window of the modified home page of the NSP 16, with the modified home page (including advertisements) being displayed on the DTE 14. In a third method, in which the DTE 14 is not executing the modified browser client software 26, a code module is downloaded from the NSP 16 to the DTE 14 which allows the browser to include a window for displaying the advertisements. In a fourth method, when the connection path 20 is idle, the advertisements are transmitted to the DTE 14 and displayed in a transient display window. The transient window is opened on the DTE 14 allowing the advertisements to be played/displayed while the connection path 20 is idle. When there are data packets to be transmitted to/from the DTE 14 such that the connection path 20 is no longer idle, the transient window is either closed or made a background window. If the transient window is made a background window, the transient window is movable to the foreground upon entry of a predetermined command at the network terminating device.

Traffic to and from the DTE 14 is monitored to determine when the connection path 20 is idle so that announcements may be transmitted to the DTE 14. Preferably, the modified network server software 24 includes means for monitoring traffic destined for the DTE 14 or being generated by or transmitted from the DTE 14. In an alternative embodiment, in order to prevent adversely impacting performance of the NSP 16, the NSP 16 includes a separate processor or front end processor (FEP) 28 for monitoring the traffic directed to the DTE 14 or generated by the DTE 14. The FEP 28 may comprise any type of processor or computer suitable for monitoring the traffic to/from the DTE 14 and communicating with the modified network server software 24, such as an IBM compatible personal computer or a more specialized device. The FEP 28 thus monitors data traffic to determine when such traffic is being received by the NSP 16 on behalf of the DTE 14 or when traffic is being generated by the DTE 14, determines when to initiate, interrupt, reestablish or terminate playing or transmitting messages to the DTE 14, and generates a corresponding signal to trigger such action.

The present invention further comprises an advertising or announcement server 30 connected to or in communication with the NSP 16. The announcement server 30 stores and retrieves advertising messages. The advertising messages transmitted to the DTE 14 may comprise text, graphics, audio, video, combinations thereof, and the like, as is known to those of ordinary skill in the art. Preferably, when a user at the DTE 14 establishes communication with the NSP 16 (i.e. connects or logs on), the NSP 16 initiates a task on the announcement server 30 which determines whether the user subscribes to available advertising services, for instance by checking the user or the user's identification against a list of known subscribers stored in a database 32 of the announcement server 30. Alternatively, the NSP 16 could check if the user is a subscriber and the database 32 could be stored in a memory of the NSP 16. Note also that in the presently preferred embodiment, the announcement server 30 is connected to the subscriber's local NSP 16, and not to a remote host or computer 12. It is presently preferred that each NSP 16 will have its own announcement server 30 coupled thereto for transmitting messages to individual NSP subscribers. However, the NSP 16 could be served by an announcement server 30 which is not co-located with the NSP 16. It is presently preferred that the announcement server 30 comprises a processor and associated memory separate from the NSP 16, such as a personal computer or workstation. However, it will be apparent to those of ordinary skill in the art that the functions of the announcement server 30 could be performed by the NSP 16, for instance, by executing a software program, such as a terminate and stay resident program, on the NSP 16, which fetches advertisements and transmits the advertisements to the DTE 14.

Preferably, announcements are enabled by inserting a software subroutine into the network server software program 24 operating on the NSP 16. It is well known to those in the art the various ways the software can be incorporated into the network server software 24 and, therefore, such ways are not discussed. Suffice it to say, the modified network server software 24 and the modified browser client software 26 cause data transmission procedures to be modified such that messages or announcements generated by the announcement server 30 and provided to the NSP 16 are transmitted to the DTE 14 when the DTE 14 is idle (i.e. not sending or receiving other data to/from the NSP 16 or another computer 12), so that the announcements are played on the DTE 14, as discussed in more detail below. Alternatively, selected announcements are retrieved and downloaded to a local storage device of the DTE 14 from the announcement server 30 by way of the NSP 16 when a connection is established between the DTE 14 and the NSP 16. Such downloaded announcements are then played/displayed on the DTE 14 as specified by the modified browser client software 26.

In the preferred embodiment, the announcement server 30 selects the type of announcements which are transmitted to the DTE 14. The announcement server 30 can also determine the time when a particular announcement is to be played based upon a number of criteria or factors, such as but not limited to, the time of day, the day of the week, the month of the year, the Internet Protocol (IP) address of the DTE 14 or the IP or universal resource locator (URL) of a computer 12, etc. If the announcement server 30 is set to determine which announcements are to be played based upon the IP address of the DTE 14, the announcement server 30 reads the IP address as provided by the NSP 16 and determines the identity of the user by matching the IP address with a data record stored in the database 32 or other storage structure of the announcement server 30, such as by executing a table look up. The announcement server 30 determines which announcements are designated for the particular IP address and transmits the prestored announcements in a predetermined manner, as described in more detail below. If the announcement server 30 is set to determine which announcements are to be played based upon the time of day, day of week, month of year or any other time frame reference, the announcement server 30 can access the time from a clock (not shown) located within the announcement server 30, which maintains the time of day, day of week, day of month, month of year and year. When a connection is made to the NSP 16 from the DTE 14, and the announcement server 30 has been signaled to initiate a message sequence, the information from the clock is read by the announcement server 30 and compared to information located in a look-up table in the memory of the announcement server 30 to determine which messages are to be played. The announcement server 30 retrieves the designated messages while the connection path 20 is idle until the DTE 14 to NSP 16 connection is terminated. It should be appreciated that, if desired, live announcements may be provided under control of the announcement server 30.

Alternatively, the type of announcements transmitted by the announcement server 30 to the NSP 16 may comprise a type of announcement selected by the user at the DTE 14. For instance, the announcements transmitted to the DTE 14 could be selected from different predetermined categories, such as finance related announcements, automobile related announcements, sports related announcements, etc. The subscriber/user can select a category of interest and then the announcement server 30 transmits advertisements applicable to the user selected category to the DTE 14. It is to be understood by those skilled in the art, that the advertisements can be of any particular subject matter and are not restricted to those mentioned above.

The announcement server 30 includes software which is capable of providing a custom menu and custom announcements to subscribers. The announcement server 30 provides customized menus for selected subscribers based upon previous menu selections made by the subscribers. That is, the software contains software filters and agents which allow the software to learn (i.e., remember and act upon) a subscriber's previous menu selections and customize an individual subscriber menu based upon the previous selections or other subscriber input. It is understood by those of ordinary skill in the art how to provide software including software filters and agents to provide a system which self-learns based upon previous subscriber menu selections or other subscriber input and accordingly, such software is not further discussed herein.

In addition to storing, retrieving and transmitting advertising messages to the DTE 14, the announcement server 30 is programmed to retrieve and transmit certain types of real-time information, such as current financial information, current sports related information, etc. That is, the announcement server 30 is connected to a plurality of remote processors 12 by way of the NSP 16 which have available such real-time information and continually updates a local database or storage structure 34. Then, for example, in the case of a user that subscribes to a real-time information service which provides up to the minute sports information, such sports information is retrieved from the local database 34 and transmitted to the subscriber, along with or in place of advertising messages. Alternatively, a separate real-time information server 36 is provided which is continually retrieving predetermined categories or types of information so that such information is available to subscribers of real-time information service. The real-time information server 36 operates preferably in an identical manner to the announcement server 30 except for the inclusion of a plurality of databases 38 for storing predetermined types of real-time information. The real-time information server 36 continually updates the plurality of databases 38 by retrieving information from a variety of sources, networks or computers 12. The means and methods of retrieving and storing such information is known by those of ordinary skill in the art. Preferably, the real-time information server 36 comprises the same hardware as the announcement server 30.

Referring specifically to FIG. 2, there is shown a block diagram depicting the internal components of a preferred embodiment of the announcement server 30. Each announcement server 30 comprises a processor or microprocesssor 40, such as a microprocessor available from Intel Corporation, for processing stored announcements and transmitting the announcements to the DTE 14 of a subscriber through the NSP 16 or network 10, although it is to be understood by those skilled in the art that any other type of computer, processor or microprocessor can be used in conjunction with the announcement server 30. A storage or memory device 42 is connected to the microprocessor 40 and acts as a mass storage device for storing the pre-recorded announcements, associated data, as well as the software necessary for control of the announcement server 30 and for associated processing. The storage device 42 preferably comprises a random access memory (RAM) and a magnetic hard disk or an optical storage device, such as, but not limited to, a CD-ROM, CD-I, or optical disk. However, it is understood by those skilled in the art that other means for storing the software and the pre-recorded announcements can also be used, such as a programmable ROM or embedded memory means.

Data relating to a specific pre-recorded announcement is transmitted from the storage device 42 to the microprocessor 40 to enable processing of the announcements. Alternatively, if the announcement server 30 includes a direct memory access, the announcement can be transmitted directly from the storage device 42 to the NSP 16 and then to the DTE 14. In the preferred embodiment, the announcement server 30 also comprises a digital audio converter or card 44 and/or a video card 46 for receiving audio or visual data and processing such data so that it can be stored in the storage device 42 and played/displayed at the appropriate time. An interface jack 48 is connected to the digital audio converter 44 to permit audio announcements to be converted to digital format for storage within the storage device 42. The interface jack 48 allows the announcement server 30 to be updated with new announcements by uploading the announcements to the announcement server 30 from a remote location using a telephone system (not shown). The announcement server 30 can also be updated remotely through the computer network 10 in a conventional manner (e.g. new advertisements can be uploaded to the announcement server 30 from a remote processor using the computer network 10).

A clock 50 is located within or associated with the microprocessor 40 and can be used to monitor a predetermined period of time for each announcement to be displayed, if such a predetermined period of time has been specified. That is, a timing option allows a predetermined minimum display time to be specified for each advertisement. If such a predetermined minimum time is not specified, the advertisement is played/displayed until either another advertisement is ready to be played/displayed or until the user at the DTE 14 aborts or terminates the session. In order to collect statistical information on the announcements displayed on the DTE 14, time based data, such as the time an announcement was played, is recorded and stored within the storage device 42. The clock 50 is also capable of recording the period of time necessary for a sequence of messages or announcements to be transmitted and displayed on the DTE 14. Such clocks are well known to those of ordinary skill in the art.

The NSP 16 is connected to the microprocessor 40 via a communication interface device 52, which allows for the transfer of information to and from the announcement server 30. In the preferred embodiment, the communication interface device 52 is a digital data communications port (DDCP). Once the microprocessor 40 receives a signal from the NSP 16, an announcement is retrieved from the storage device 42 and transmitted to the NSP 16. The NSP 16 then transmits the announcement to the DTE 14. The modified network server program 24 on the NSP 16 sends such a signal to the microprocessor 40 of the announcement server 30 when the communication path 20 is idle, as previously discussed.

The microprocessor 40 is also connected to a main controller 54 via a communication interface 56, such as a modem. The main controller 54 acts as a main processing system for all of the advertising servers 30 connected to the NSP 16. The main controller 54 could also function as the main processing system for other advertising servers 30 connected to other NSPs connected to the network 10, although it is foreseen that each NSP 16 will have its own main controller 54.

Internal software in the announcement server 30 cross-references the number of announcements played to the user at the DTE 14 to the person or entity which is sponsoring each of the announcements and transmits this information to the main controller 54. In the preferred embodiment, the sponsoring person or entity can be an advertiser or some other type of a billable or non-billable client. The main controller 54 generates a billing schedule for determining the amount which the sponsoring person or entity should be charged. Thus, the main controller 54 maintains data files and logs into its data files each announcement which is played to a particular DTE 14. In the preferred embodiment, the controller 54 records other information about the advertisements, such as statistical information, including the advertisement's file name, play time, geographical area in which the advertisement has been played, IP address of the subscriber and/or URL of the computer 12 accessed, and any billing charge associated with the playing of the announcement. In the preferred embodiment, the main controller 54 and the announcement server 30 are accessible by dialing to or being dialed by remote computing equipment, such as a DTE connected to a computer 12 of the computer network 10, in order to transfer billing records so that the appropriate sponsoring person or entity can be billed. In an alternative embodiment, regional computing equipment which receives billing records from remote advertising servers 30 can connect with central computing equipment for central billing and processing. Of course, such billing may also be done using the resources of the computer network 10 (e.g., via e-mail). It is to be understood by those skilled in the art, that the main controller 54 can store any other information which is considered to be pertinent to the system's billing and processing requirements.

The main controller 54 acts as the central record keeping and billing location. The main controller 54 can also remotely deliver and update all audio and/or video advertising and other announcements contained at each announcement server 30. In the preferred embodiment, advertisements and announcements stored in the storage device 42 of the announcement server 30 are also updated by remote computing equipment which dials to (or is dialed from) the announcement server 30, as previously discussed, in order to transfer audio and video advertisements and/or messages or to delete or modify previously stored announcements or messages using the interface 48. The advertisements stored in the storage device 42 are also accessible and updatable by an authorized user or supervisor communicating with the announcement server 30 from a remote device or computer (not shown) which communicates with the announcement server 30 by way of the computer network 10. The main controller 54 may comprise either a separate computer system, such as a personal computer, or the main controller 54 may be implemented in software, such as with a terminate and stay resident (TSR) software program executing on the microprocessor 40, as will be apparent to those of ordinary skill in the art.

The announcement server 30 transmits at least one pre-recorded announcement to the DTE 14 whenever the connection path 20 is idle. In the preferred embodiment, the pre-recorded announcements are played/displayed in a display window of the DTE 14 for either a variable or predetermined amount of time whenever the connection path 20 to the DTE 14 is idle. Generally, an announcement comprises one or more advertisements which are digitally stored within the announcement server 30. The announcement server 30 determines the type of advertisements and the duration for which the advertisements are played/displayed on the DTE 14. The advertisements may be played/displayed for either a fixed or variable amount of time. For instance, one advertiser may contract to display an advertisement for five seconds and a second advertiser may contract to display an advertisement for thirty seconds or until the DTE 14 is disconnected. The type of announcements to be played are determined by comparing information, such as the network address of the DTE 14 or the time of day, to a look up table located within the database 32 of the announcement server 30.

A playing format is determined from information stored in the database 32 about each subscriber's DTE 14 or by information determined by the NSP 16. The NSP 16 determines the speed of the DTE 14 access connection and relays this information to the announcement server 30. The announcement server 30 uses the connection speed to select the appropriate types of announcements or advertisements to play. That is, if the DTE 14 is connected to the NSP 16 via a low speed connection or the DTE 14 is not capable of handling advanced video graphics or audio messages, then only graphics and text based advertisements are selected for displaying at the DTE 14. However, if the DTE 14 has a high speed connection to the NSP 16 and the DTE 14 is capable of playing video and/or audio messages, then advertisements including more sophisticated video and audio data are played on the DTE 14. It is to be understood by those skilled in the art that any type of advertisement and/or message can be generated by the announcement server 30. Once the playing format is determined, the digitally stored announcements are retrieved from the storage device 32 of the announcement server 30 by the modified network server software 24 operating on the NSP 16 and transmitted to the DTE 14.

In operation, upon initiation of a service request from the DTE 14, such as a search request or a request to connect to a remote computer 12, etc., the modified network server software 24 processes the request in a conventional manner. If the NSP 16 includes the FEP 28, the FEP 28 monitors the traffic destined for the DTE 14 or generated by the DTE 14 and determines when the connection path 20 is idle. When there is no traffic destined for the DTE 14 or traffic generated by the DTE 14, such that the connection path 20 is idle, the FEP 28 signals the announcement server 30 to originate, suspend, reinitiate or terminate the transmission of announcements to the DTE 14. The announcement server 30 then preferably transmits digitally stored advertisements, messages or announcements to the user at the DTE 14 for as long as the connection path 20 is idle. The FEP 28 also continually monitors the transmission of information between the NSP 16 and the computer network 10 (i.e. the communication paths 18) and interacts with the modified network server software 24 to determine if the user's service request has been processed and/or completed, in order to determine if the transmission of the advertisements to the DTE 14 should be suspended or terminated. The FEP 28 signals the announcement server 30 to suspend transmission of advertisements to the DTE 14 when the modified network server software 24 has data to transmit to the DTE 14. The announcement server 30 then suspends transmission of the advertisements to the DTE 14 to allow the modified network server software 24 to transmit the data to the DTE 14 over the connection path 20. The announcement server 30 will reinitiate sending advertisements to the DTE 14 when the modified network server software 24 has finished transmitting its data to the DTE 14 and if the connection path 20 is idle, as determined by the FEP 28. Alternatively, in lieu of the FEP 28 monitoring the traffic destined for or generated by the DTE 14, the modified network server software 24 could perform this function and initiate, suspend, terminate, or reestablish the transmission of an announcement sequence to the DTE 14.

As is understood by those of ordinary skill in the art, a user's search results (or other activity response) usually comprises a plurality of data packets (hereinafter "response packets"). Accordingly, in the preferred embodiment, if the network server software 24 has received one or more response packets (e.g., connection to remote host established or search results received), the network server software 24 signals to the announcement server 30 to interrupt or terminate the announcement sequence (i.e. the transmission of announcements to the DTE 14). In an alternative embodiment, described in more detail below, the network server software 24 will buffer a predetermined small amount of the response packets in a buffer prior to notifying the announcement server 30 to suspend or terminate the transmission of advertisements to the DTE 14. Then, when the response packet buffer is filled or when a last response packet has been received, the network server software 24 will notify the announcement server 30 to suspend transmission of the advertisements and transmits the buffered data to the DTE 14. In this manner, the announcement server 30 is able to extend by a small amount of time, such as a few seconds, the transmission of advertisements to the DTE 14.

The announcement server 30 is capable of interacting with the user so that, for example, the user can obtain additional information relating to a particular announcement or select different types of advertising. At the appropriate prompt provided by the announcement server 30, a user at the DTE 14 could respond by clicking on an icon or hypertext field, by pressing a key on a keyboard, touch screen or by otherwise entering and transmitting a command to the NSP 16. Once the modified network server software 24 detects the assertion of a given prompt from the DTE 14, the modified network server software 24 connects the DTE 14 to the remote computer 12 of the advertiser, as specified by an URL embedded in the hypertext field. For example, if the announcement relates to a sale at a particular retail store, the DTE 14 can be connected to the retail store or a home page of the retail store automatically to obtain additional information or purchase the advertised product on-line. Alternatively, the announcement server 30 can provide, upon a given prompt by the user, the network address (or other contact information) of the advertiser to the user so that the user may later access the home page of the advertiser, telephone the advertiser, or otherwise contact or obtain the desired further information.

The announcement server 30 is also capable of inquiring if the user wishes to be sent follow up information. If the user answers in the affirmative, the announcement server 30 can record the name and address or fax number or e-mail address of the user and establish a customer mailing list therefrom. The user responds to the announcement server 30 by either clicking on a predetermined icon or field of the display or a using a keyboard to enter a command, or a voice activated response which is transmitted to the announcement server 30, which records the user's response. In addition, the announcement server 30 can provide a recorded customer list which can become a permanent part of the sponsoring person or entity's records and be included along in billing invoices. It is to be noted that at the completion of any option of the system, the system can determine billing and record relevant data about the advertisements which were played. The announcement server 30 can also provide users with a directory type service whereby a user can browse through an advertiser's product listings. Such a service would be advantageous if a sponsoring person or entity produced or manufactured a large number of products. Along with the listing, a user has the capability of requesting additional information, such as, but not limited to prices and quantity. As discussed above, if the user wishes to obtain additional information, the user can assert a given prompt to cause the announcement server 30 to connect the user to the advertiser (e.g., a remote computer 12).

Referring specifically to FIGS. 3–6, there are shown flow diagrams depicting the various methods of providing advertisements to the DTE 14 while the connection path 20 is idle. While each of the methods is different, each method is part of an overall system for providing the advertisements to the DTE 14, as will become apparent when reviewing FIG. 7. In addition, although the flow diagrams often show duplicative steps, it will be understood by those skilled in the art that such steps could comprise a single software procedure or subroutine.

Figure 8A:
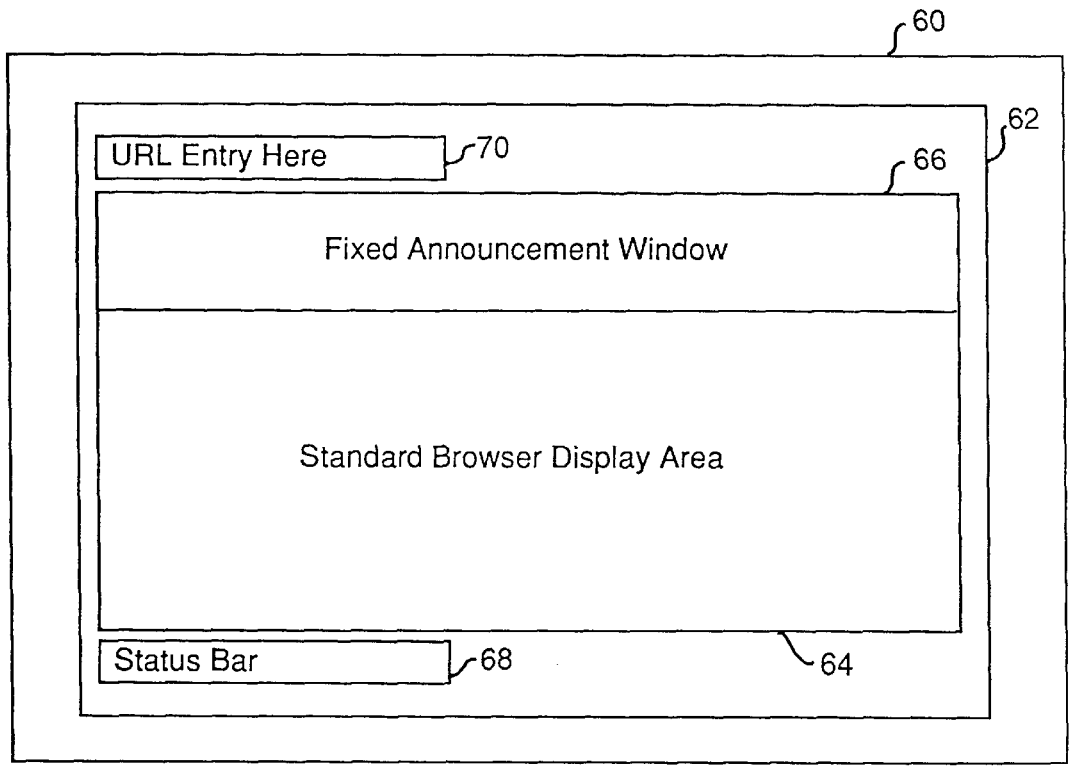
FIGS. 8A–8D are plan views of a browser client display window with a predetermined message being displayed according to respective preferred embodiments of the present invention.

Referring now to FIGS. 3A–3F, the first method of transmitting advertising messages to the DTE 14 is shown. According to the first method, the browser client program operating on the DTE 14 is modified to operate with two or more simultaneously active display windows, using the modified browser client software program 26. That is, the modified browser client program 26 allows a second, fixed announcement window to be displayed, in addition to the standard browser display window. FIG. 8A shows a monitor viewing area 60 of the DTE 14 in which the modified browser client program 26 user interface 62 is displayed. The user interface 62 includes the standard browser display area 64 and the fixed announcement window 66. The standard browser display area 64 is conventional and the fixed announcement window 66 displays the advertisements which are transmitted to the DTE 14 when the connection path 20 is idle. The modified browser 62 also includes such conventional items as a status bar 68 and an URL entry area 70. Preferably, the fixed announcement window 66 is smaller in size than the standard browser display area 64. According to the invention, one or more advertisements are continually displayed in the fixed announcement window 66. Although the advertisements are transmitted to the DTE 14 when the connection path 20 is idle, the last advertisement to be displayed prior to the connection path 20 becoming busy will continue to be displayed while the connection path 20 is busy. The advertisement will thus remain displayed until such time as the connection path 20 is no longer busy and another advertisement is transmitted to the DTE 14 or until the user aborts or terminates the session.

Beginning at step 100, a user at a first station or the DTE 14 executes the modified browser client software program 26. The browser client software program 26 initially determines the NSP connection type at step 102, as either a dial-up connection or a dedicated line connection. If the NSP connection type is a dial-up connection, then the browser client software program 26 interacts with the modem 20 to establish a dial-up connection with the NSP 16 at step 104 in a conventional manner. The modified network server software 24 executing at the NSP 16 then answers the call, authenticates the user and assigns the user an IP address. The method then proceeds to step 106. Alternatively, if the NSP connection type is a dedicated line, as opposed to a dial-up connection, as determined at step 102, then the method skips step 104 and proceeds with step 106. At step 106, the modified network server software 24 determines whether the user is a subscriber to the information service of the present invention. At step 108, if the user is not a subscriber, as determined in step 106, then the method proceeds with step 110 and if the user is a subscriber, the method proceeds with step 120.

Figure 3A:
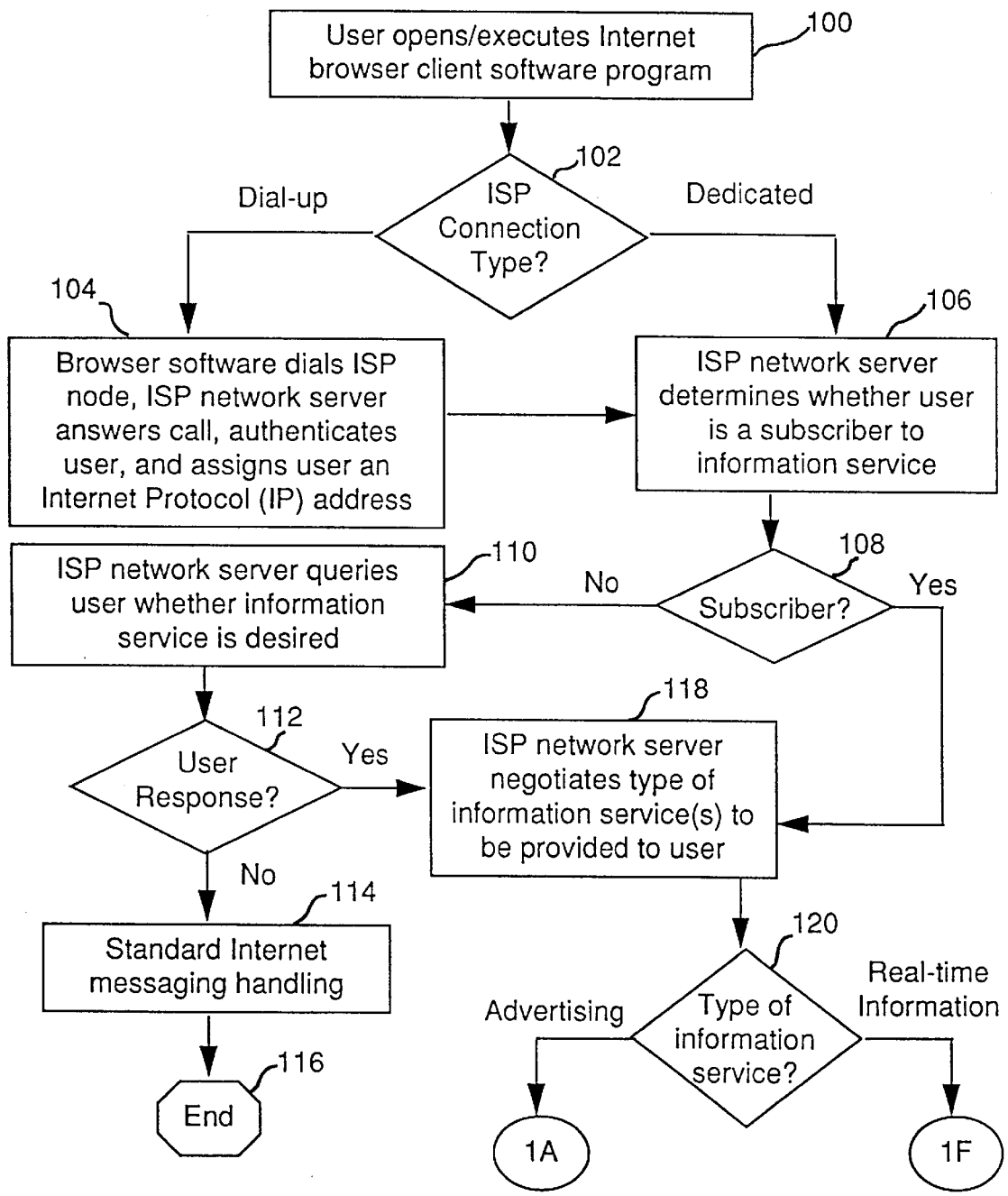
FIGS. 3A–3F are a flow diagram of a first preferred embodiment of the operation of the network communications system of FIG. 1.
Figure 3B:
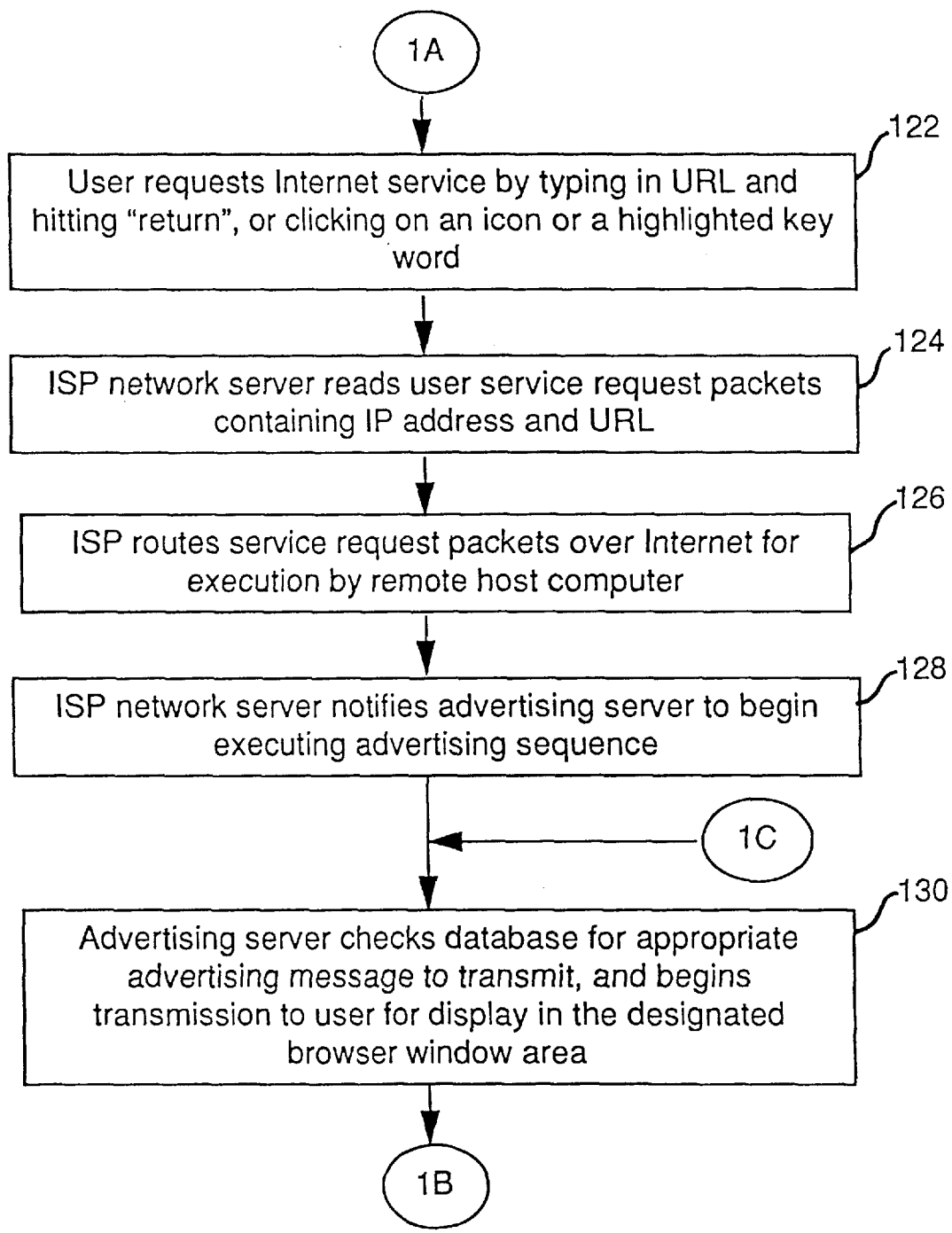

At step 110, the modified network server software 24 queries the user to determine if the user desires to become a subscriber to the information service. The modified network server software 24 may query the user by transmitting a query to the DTE 14, the query includes a response field for allowing the user to easily respond to the query, by either entering a response using a keyboard, clicking on an icon, clicking on a highlighted field, or otherwise responding to the query in a manner known to those of skill in the art. At step 112, the user's response is determined and if the user answers the query in the negative, the method proceeds with step 114, in which case standard Internet message handling occurs such that the announcement server 30 does not interact with the DTE 14, as noted at step 116. If the user responds affirmatively to the query for information service, then at step 118, the modified network server software 24 negotiates a type of information service to be provided to the user, such as real-time information services or advertising services, described in more detail below. At step 120, if advertising services have been selected, execution proceeds with step 122 (FIG. 3B).

At step 122, the user requests a network or Internet service, as is known by those of ordinary skill in the art, by typing in a URL and entering return or clicking on an icon, or clicking on a highlighted keyword, etc., which causes the DTE 14 to transmit a command to the NSP 16. At step 124, the modified network server software 24 reads the user's service request packets (data packets are formed by the browser client software program 26 and transmitted to the network server software program 24 as is known by those of ordinary skill in the art). The service request packets include an IP address and/or an URL. At step 126, the modified network server software 24 routes the service request packet over the computer network 10 for execution by a remote host computer 12, as specified in the request packet. During this sequence of events, either the modified network server software 24 or the FEP 28 is monitoring the traffic destined for or generated by the DTE 14. At step 128, the modified network server software 24 or the FEP 28 sets a flag signalling that the connection path 20 is idle. When the announcement server 30 learns that the connection path 20 is idle (for example, by checking the status flag), the announcement server 30 begins executing an advertising sequence. An advertising sequence comprises the generation (e.g. fetch from storage) and transmission of at least one generally continuous advertising message or preferably, a sequence of advertisements to the DTE 14 while the connection path 20 is idle. At step 130, the announcement server 30 checks the database 32 to determine appropriate advertising messages to be transmitted to the user at the DTE 14 and begins transmitting messages to the user by way of the NSP 16 and the modified network server software 24 for display in the announcement window 66 of the modified browser client program 26.

Figure 3C:
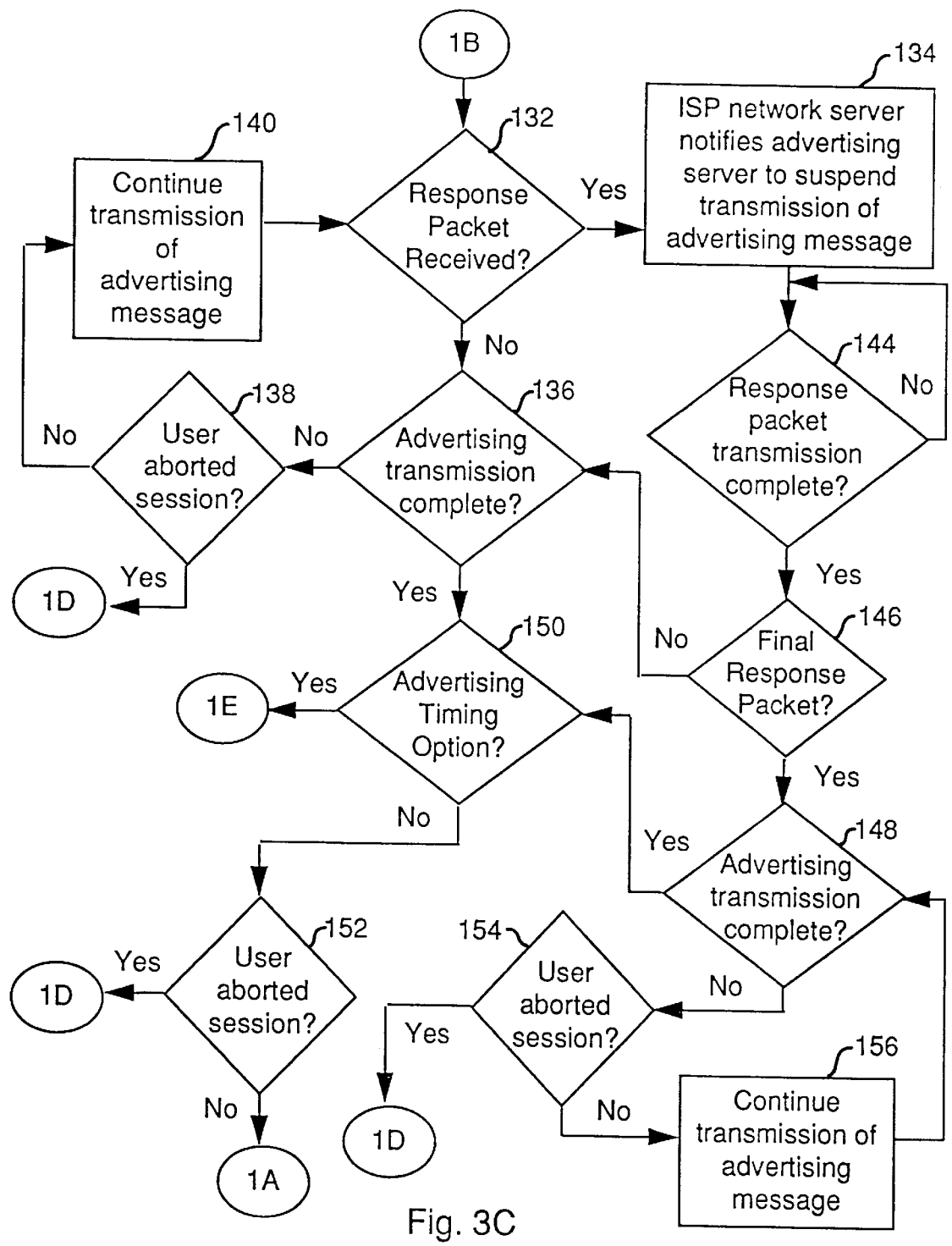

Proceeding now to FIG. 3C, preferably the advertising messages transmitted to the DTE 14 include an interaction means for permitting the user at the DTE 14 to respond to the advertising messages and interact with the announcement server 30. For instance, the user could initiate a predetermined response by entering a command in the fixed announcement window 66 in which the advertising messages are being displayed, such as by clicking on an icon or clicking on a highlighted field (i.e. hypertext, or text with a hyperlink).

When the user's service request, initiated at step 122, is completed or being serviced, a response packet is transmitted from the remote computer 12 to the NSP 16 where it is received by the modified network server software 24, which in turn notifies the announcement server 30 to discontinue transmitting the announcement sequence to the DTE 14. In an alternative embodiment, the FEP 28 detects that the response packet is for the DTE 14 and informs the announcement server 30 (either directly or indirectly through the modified network software 24) that a response packet for the DTE 14 has been received and to discontinue transmitting advertising messages to the DTE 14. For instance, the FEP 28 sets a flag or status bit which is periodically checked by the modified network server software 24. Thus, at step 132, the modified network server software 24 checks to determine if such a response packet has been received (i.e. that the flag has been set). If a response packet has been received, the modified network server software 24 branches to step 134 and if a response packet has not been received, execution proceeds with step 136. At step 136, the announcement server 30 checks to determine if the transmission of advertising messages to the DTE 14 is complete. If there are messages remaining to be transmitted to the DTE, at step 138, the announcement server 30 queries the modified network server software 24 to determine if the user has aborted the session, such as by disconnecting from the NSP 16. If the user has not aborted the session, and the advertising transmission is not yet complete, the announcement server 30 continues to transmit messages to the DTE 14 at step 140. In addition to transmitting advertisements to the DTE 14, the announcement server 30 can also optionally transmit network status messages to the DTE 14.

Figure 3D:
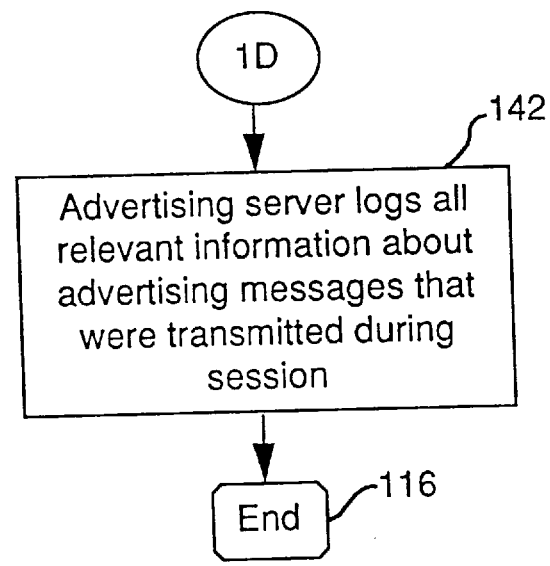

Referring to FIG. 3D, if the user aborted the session, as determined at step 138, then at step 142, the announcement server 30 executes a logout procedure, which logs or records all relevant information about the advertising messages that were transmitted to the DTE 14, and stores such information in a database in its storage device 32, and then finishes processing at step 116.

Referring back to FIG. 3C, if the remote computer 12 has transmitted a response packet back to the modified network server software 24, as determined at step 132, then at step 134, the modified network server software 24 notifies the announcement server 30 to suspend transmission of the advertising messages to the DTE 14. The modified network server software 24 then determines if the response packet transmission from the DTE 14 is complete at step 144. If the transmission is not complete, the modified network server software 24 waits (i.e. loops) until the response packet transmission is complete before executing step 146. Step 146 determines if a final response packet has been received from the remote computer 12 (for example, indicating that a search has been completed, along with the results of the search). If a final response packet has not been received, the modified network server software 24 notifies the announcement server 30 to resume execution (step 136), as previously described. However, if a final response packet has been received, as determined at step 146, then at step 148, the announcement server 30 determines if the advertising transmission is complete. If the advertising transmission is complete as determined at either step 148 or step 136, then the announcement server 30 checks to determine if an advertising timing option is enabled, at step 150. The advertising timing option is an option which allows a time limit to be set for displaying advertising messages. The timing option is enabled (turned on) by setting a gate or flip-flop in the announcement server 30, or by setting a bit in a register associated with a particular subscriber or with a particular advertisement. For instance, some advertisements may be set to be displayed for 5 seconds and other advertisements may be set to be displayed for 30 seconds. Of course, it will be apparent to those of ordinary skill in the art that advertisements can be set to be displayed for any length of time. Execution proceeds to step 152 if the timing option is not enabled, in which case the last advertisement is displayed in the fixed announcement window 66 until the connection path 20 is idle again and a new advertisement is transmitted to the DTE 14 (step 122), or until the user aborts the session (step 142).

Figure 3E:
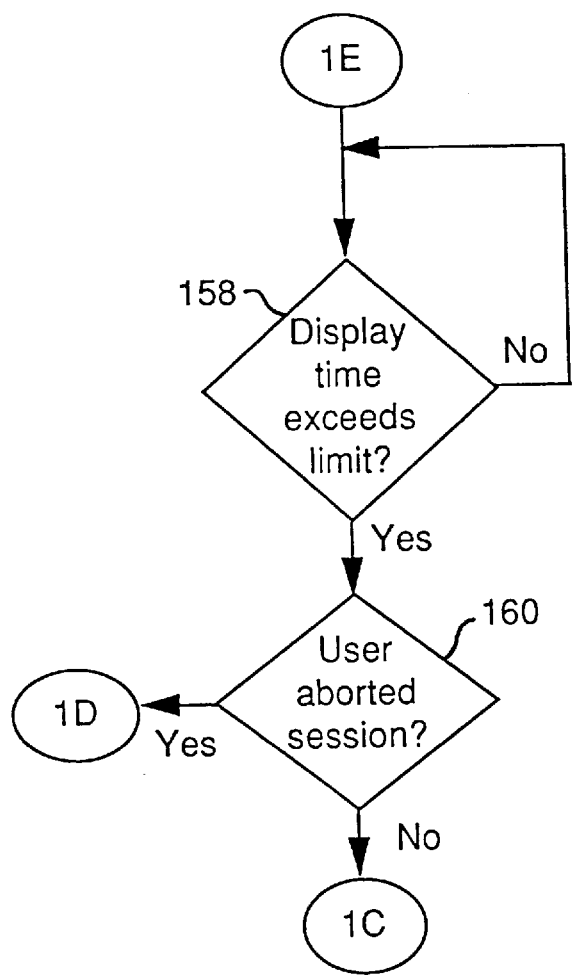

Referring now to FIG. 3E, if at step 150, the advertising timing option is enabled, then execution proceeds to step 158. At step 158, according to the advertising timing option, the announcement server 30 determines if the display time (i.e., the time spent displaying a particular advertisements on the DTE 14) exceeds a predetermined time limit. If the predetermined time limit has not been exceeded, the announcement server 30 continues to display the current advertisement and continues to check the display time against the predetermined time limit. If the predetermined time limit has been exceeded, as determined at step 158, then at step 160, the announcement server 30 checks (via the modified network server software 24) if the user has aborted the session. If the user has aborted the session, the announcement server 30 executes the logout procedure at step 142. If the user has not aborted the session, as determined at step 160, then the announcement server 30 returns to step 130, and checks its database for further appropriate advertising messages to be transmitted to the DTE 14.

If at step 148, it was determined that the advertising transmission was not yet complete, then at step 154, the announcement server 30 queries the modified network program 24 if the user has aborted the session. If the user has aborted the session, then the announcement server 30 branches to the logout procedure at step 142. If the user has not aborted the session, then the announcement server 30 continues to transmit advertising messages, as indicated at step 156 and continues transmitting messages until either the transmission of messages is complete, as determined at step 148, or until the user has aborted the session, as determined at step 154.

Figure 3F:
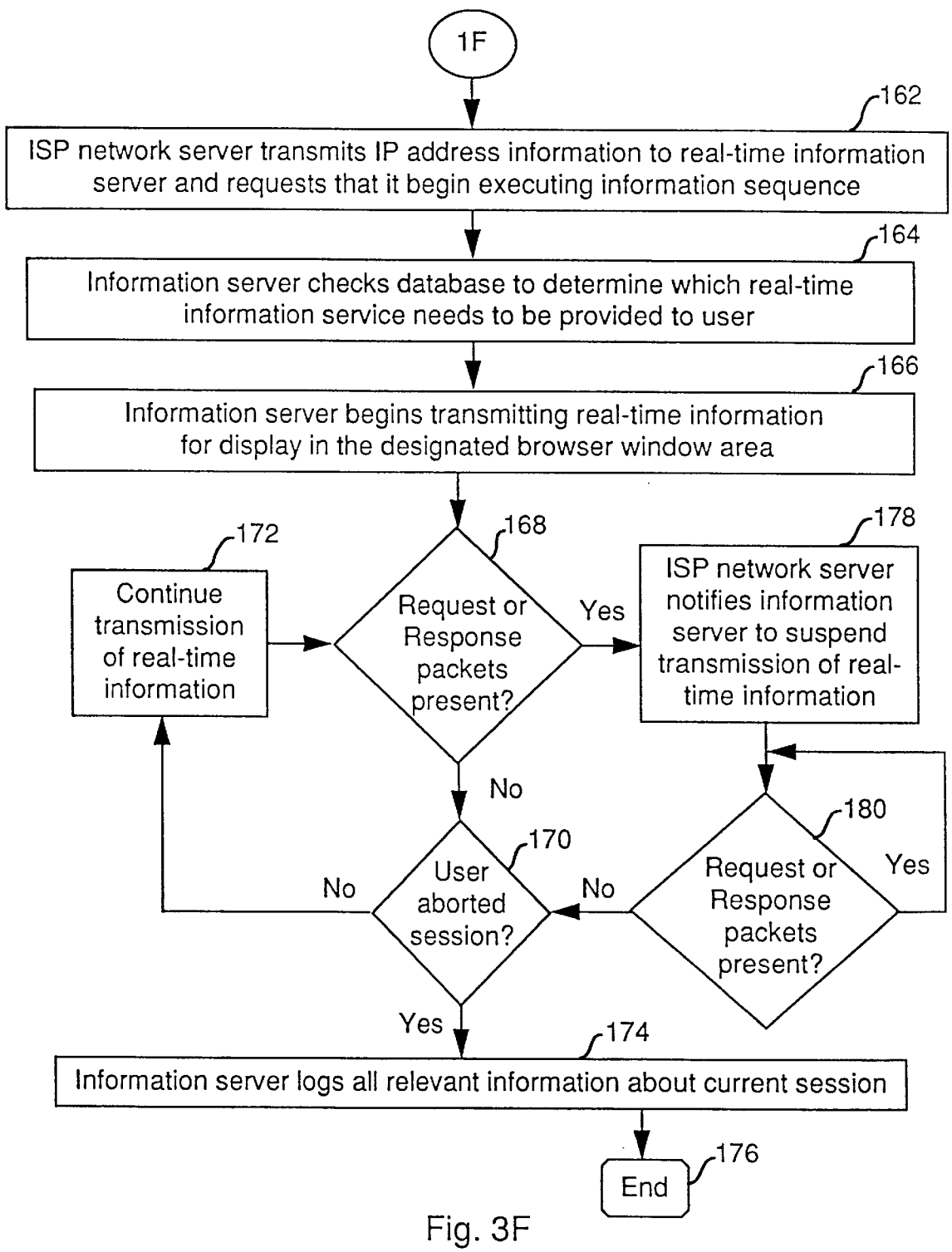

Referring now to FIG. 3F, if at step 120, the user selected real-time information service, then at step 162, the modified network server software 24 transmits IP address information to the real-time information server 36 and signals the real-time information server 36 to begin executing an information sequence. The real-time information service provides up to date (real-time) information to the user in the fixed announcement window 66 at the DTE 14 whenever the connection path 20 is idle. At step 164, the information server 36 checks a database to determine which real-time information service to provide to the user (i.e. what type if information to send, such as sporting event scores or financial information). At step 166, the information server 36 begins transmitting real-time information to the DTE 14 for display in the fixed announcement window 66. At step 168, the modified network server program 24 checks to determine if a request or a response packet has been transmitted from the remote computer 12 to the NSP 16. If a request or response packet has not been transmitted from the remote computer 12, then the modified network server software 24 checks to determine if the user has aborted the present session at step 170. If the user has not aborted the session, then the information server 36 continues to transmit real-time information to the DTE 14 at step 172.

If the user has aborted the session, then at step 174, the modified network server software 24 notifies the information server 36 and the information server 36 logs or records all relevant information pertaining to the current session and terminates processing at step 176.

If at step 168, a request or response packet is present, then at step 178, the modified network server software 24 notifies the information server 36 to suspend transmission of real-time information to the DTE 14 so that the response packets may be transmitted to the DTE 14. The response packets are transmitted to the DTE 14 by way of the connection path 20 until there are no more response packets present (step 180). When there are no more request or response packets present, step 170 is executed. Step 170 checks if the user has aborted the session. If the user has not aborted the session, the real-time information server 36 reinitiates the transmission of real-time information, as indicated at step 172. Otherwise, if the user has aborted the session at step 170, then at step 174, the information server 36 logs or records all relevant information pertaining to the current session and terminates processing at step 176.

Referring now to FIGS. 4A–4E, the second method of playing/displaying advertisements at the DTE 14 while the connection path 20 is idle is shown. According to the second method, the user at the DTE 14 communicates with the computer network 10 using an "access" page of the NSP 16 as the user's window to the computer network 10. The home page of the NSP 16 is modified and this modified home page is viewed by the user at the DTE 14. The advertisements are displayed in a fixed area of the NSP modified home page. According to this second method, the DTE 14 operates under the control of a conventional browser client program and not the modified browser client program 26.

Figure 8B:
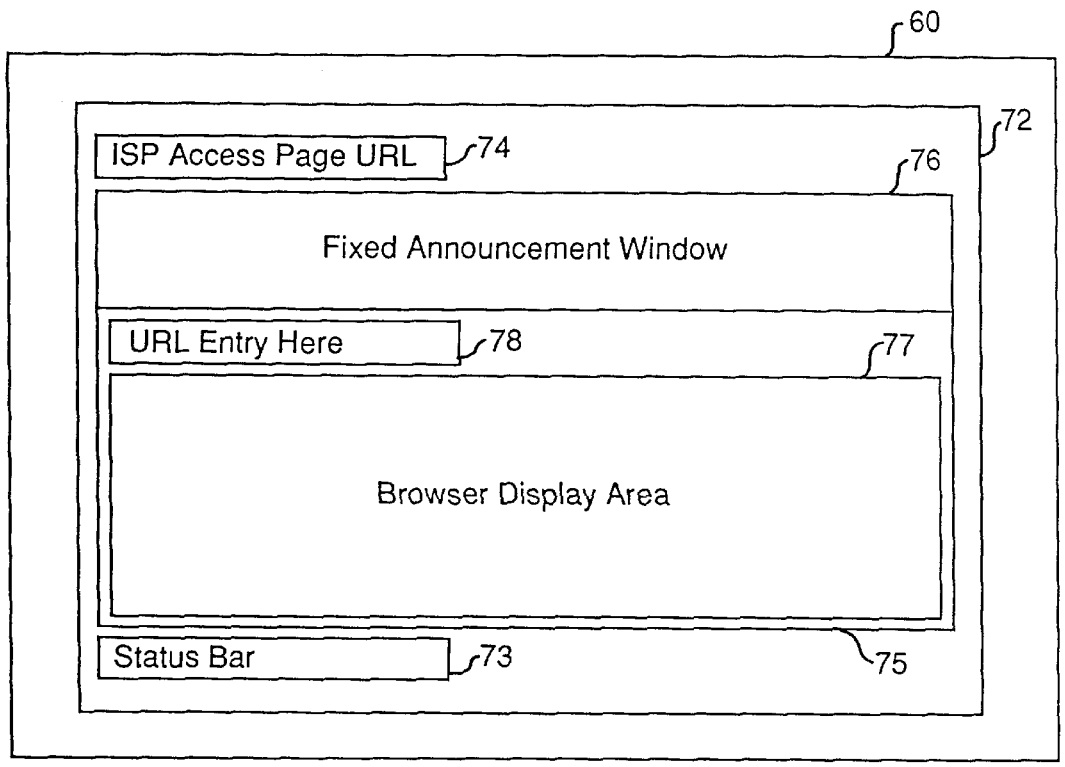

FIG. 8B shows the monitor viewing area 60 of the DTE 14. A standard browser client program executes on the DTE 14 and includes a conventional user interface 72 displayed on the monitor viewing area 60. The user interface 72 includes a conventional status bar 73 and URL display area 74. Since the user at the DTE 14 is accessing the computer network 10 by way of the modified home page or access page of the NSP 16, the URL of the NSP access page is displayed in the URL display area 74. The modified network software 24 displays a modified browser client window 75, which is displayed in the display area of the user interface 72 of the standard browser client program at the DTE 14. The modified browser client window 75 includes a fixed announcement window 76, a browser display area 77 and an URL entry area 78, similar those of the modified browser 62. Preferably, the browser display area 77 has a greater display area than the fixed announcement window 76. The fixed announcement window 76 is used to display advertisements. According to the present invention, preferably one or more advertisements are continually displayed in the fixed announcement window 76.

Figure 4A:
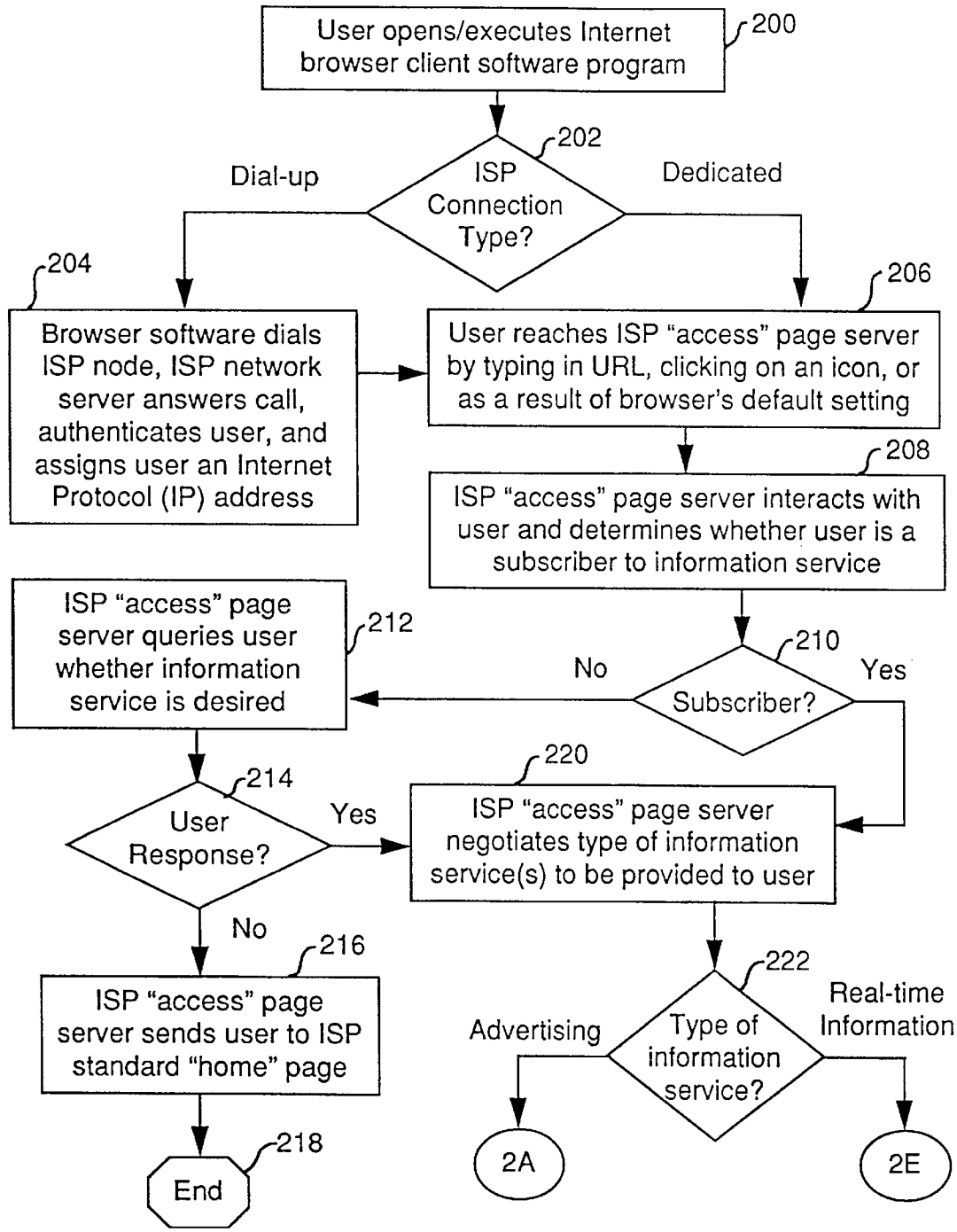
FIGS. 4A–4E are a flow diagram of a second preferred embodiment of the operation of the network communications system of FIG. 1.
Figure 4B:
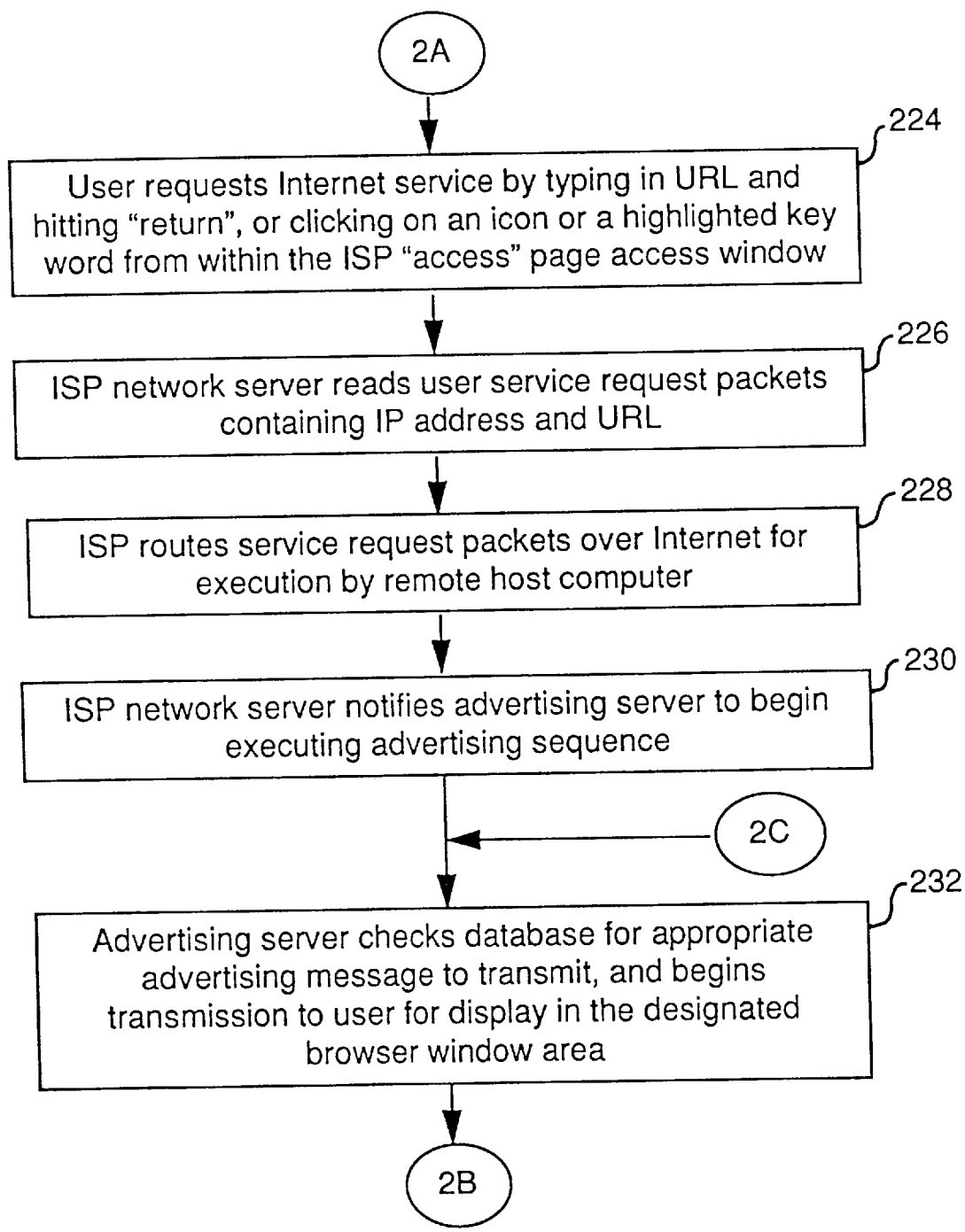

Referring now to FIG. 4A, beginning at step 200, a user at a first station or DTE 14 executes a conventional browser client software program. The browser client software program determines the NSP connection type at step 202, as either a dial-up connection or a dedicated line connection. If the NSP connection type is a dial-up connection, then the browser client software program interacts with the modem 20 in a conventional manner to establish a dial-up connection with the NSP 16 at step 204. The modified network server software 24 answers the call, authenticates the user and assigns the user an IP address. The method then proceeds to step 206. Alternatively, if the NSP connection type is a dedicated line, as opposed to a dial-up connection, as determined at step 202, then the method skips step 204 and proceeds with step 206. At step 206, the user reaches the access page of the NSP 16 to access the advertising service by entering an URL, clicking on an icon, or as a result of a browser default setting. At step 208, the modified network server software 24 interacts with the user and determines whether the user is a subscriber to the information service of the present invention at step 210. If the user is not a subscriber, then the method proceeds with step 212 and if the user is a subscriber, the method proceeds with step 222.

At step 212, the modified network server software 24 queries the user to determine if the user desires to become a subscriber to the information service. Preferably, the modified network server software 24 queries the user by displaying a query on the NSP access page being displayed on the DTE 14. The query preferably includes a response field for allowing the user to easily respond to the query, by either entering a response using a keyboard, clicking on an icon, clicking on a highlighted field, or otherwise responding to the query in a manner known to those of skill in the art. At step 214, the user's response is determined and if the user answers the query in the negative, the method proceeds with step 216, in which case standard Internet message handling occurs such that the announcement server 30 does not interact with the DTE 14, as noted at step 218. If the user responds affirmatively to the query for information service, then at step 220, the modified network server software 24 negotiates a type of information service to be provided to the user, such as real-time information services or advertising services, described in more detail below. At step 222, if advertising services have been selected, execution proceeds with step 224 (FIG. 4B) and if real-time information services have been selected, then the method proceeds with step 262 (FIG. 4E).

At step 224, the user requests an Internet service from within the access page or modified browser client window 75 of the modified network server software 24 displayed on the DTE 14, as is known by those of ordinary skill in the art, by typing in a URL and entering return or clicking on an icon or a highlighted keyword, etc., which causes the DTE 14 to transmit a command to the NSP 16. At step 226, the modified network server software 24 receives the user's service request. The service request includes an IP address and/or an URL. At step 228, the modified network server software 24 routes the service request over the computer network 10 for execution by a remote host computer 12, as specified by the request. At step 230, the modified network server software 24 notifies the announcement server 30 to begin executing an advertising sequence. As with the first embodiment, an advertising sequence is at least one generally continuous advertising message or preferably, a sequence of announcements which are repeatedly generated by the announcement server 30. At step 232, the announcement server 30 checks its database 32 to determine appropriate advertising messages to be played/displayed to the user at the DTE 14 and begins transmitting messages to the modified network server software 24 for display in the fixed announcement window 76.

Figure 4C:
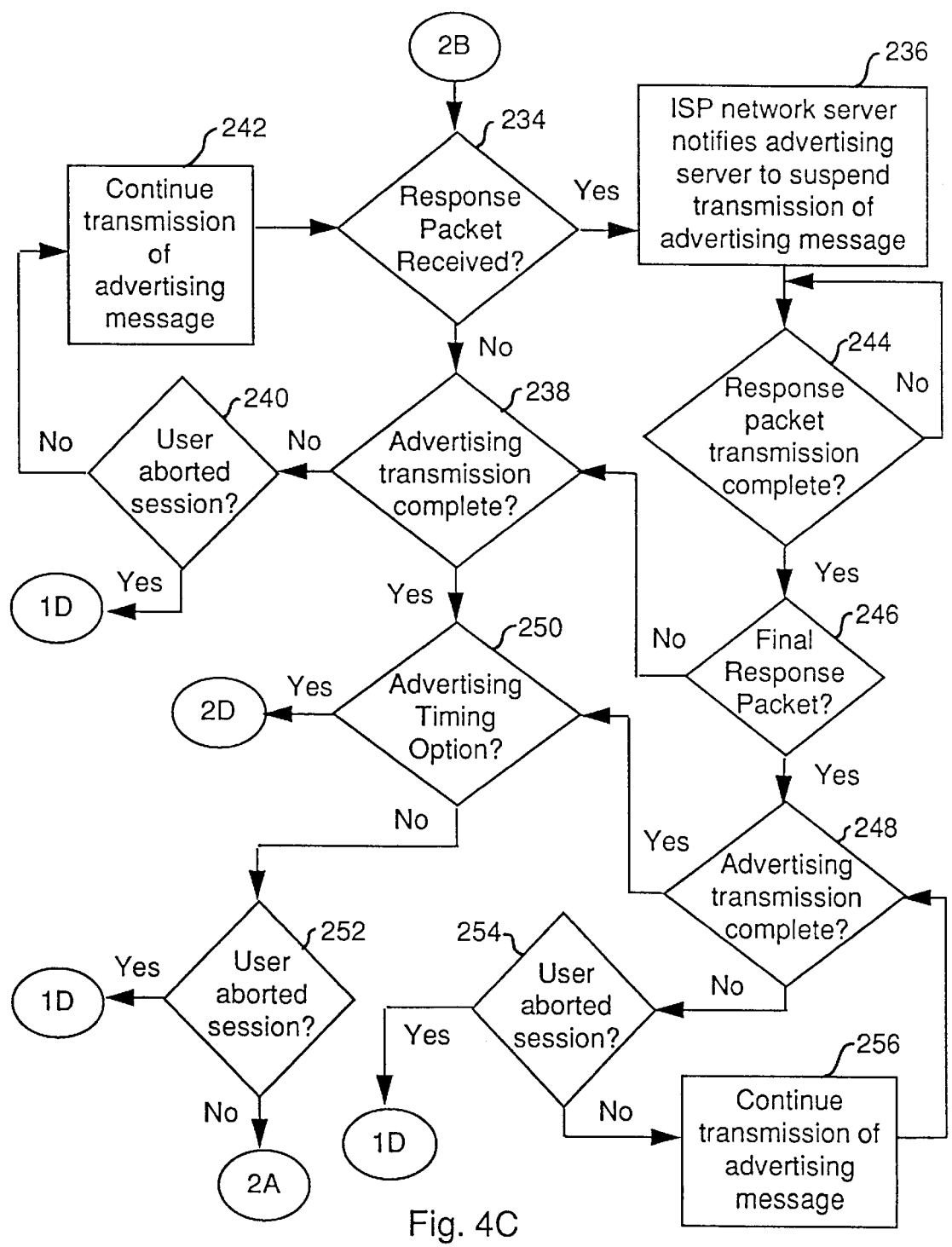

Proceeding now to FIG. 4C, preferably the advertising messages displayed in the fixed announcement window 76 include an interaction means for permitting the user at the DTE 14 to respond to the advertising messages and interact with the announcement server 30. For instance, the user could initiate a predetermined response by entering a command in the fixed announcement window 76 in which the advertising messages are being displayed, such as by clicking on an icon or clicking on a highlighted field (i.e. hypertext, or text with a hyperlink). In addition, the user may execute a standard network request from the modified browser display area 77 in a conventional manner. Upon processing of the user's network service request, such as a connection made to a remote host 12, then the remote host 12 sends a response packet to the NSP 16, as is known by those of ordinary skill in the art. At step 234, either the modified network server software 24 or the FEP 28 in conjunction with the modified network server software 24 checks to determine if a response packet for the DTE 14 has been received. If a response packet has been received, the modified network server software 24 informs the announcement server 30 that such a response packet has been received and to suspend the transmission of the advertisements (step 236). If a response packet has not been received, the announcement server 30 checks to determine if the transmission of advertising messages to the modified network server software 24 is complete (step 238). If there are messages remaining to be transmitted to the modified network server software 24, at step 240, the announcement server 30 checks to determine if the user has aborted the session, such as by disconnecting from the NSP 16. If the user has not aborted the session, and the advertising transmission is not yet complete, the announcement server 30 continues to transmit messages to the modified network server software 24 at step 242.

If the user aborted the session, as determined at step 240, then the advertising server executes the logout procedure at step 142 (FIG. 3D), which logs or records all relevant information about the advertising messages that were played/displayed, stores such information in its database 32, and then finishes processing at step 116.

If a response packet has been received by the modified network server software 24, as determined at step 234, then at step 236, the modified network server software 24 notifies the announcement server 30 to suspend transmission of the advertising messages. The modified network server software 24 then determines if the response packet transmission from the remote computer 12 is complete at step 244. If the transmission is not complete, the modified network server software 24 waits until the response packet transmission is complete, and then proceeds to step 246. At step 246, the modified network server software 24 determines if a final response packet has been received from the remote computer 12. If a final response packet has not been received, previously described step 238 is executed. However, if a final response packet has been received, then at step 248 the announcement server 30 determines if the advertising transmission is complete. If the advertising transmission is complete as determined at either step 248 or step 238, then the announcement server 30 checks to determine if an advertising timing option is enabled, at step 250. As previously discussed, the advertising timing option allows the announcement server 30 to play/display advertising messages for a predetermined time period.

Figure 4D:
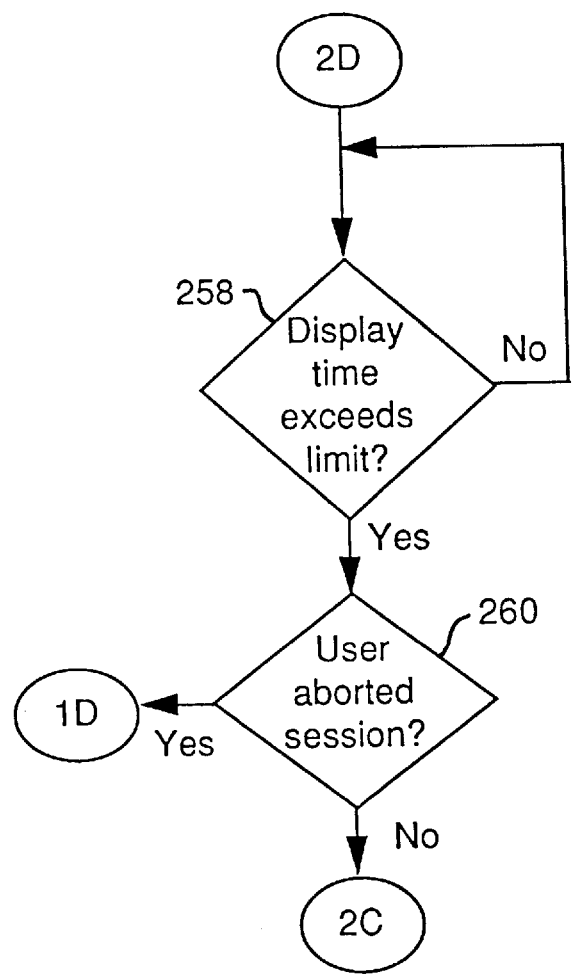
Figure 4E:
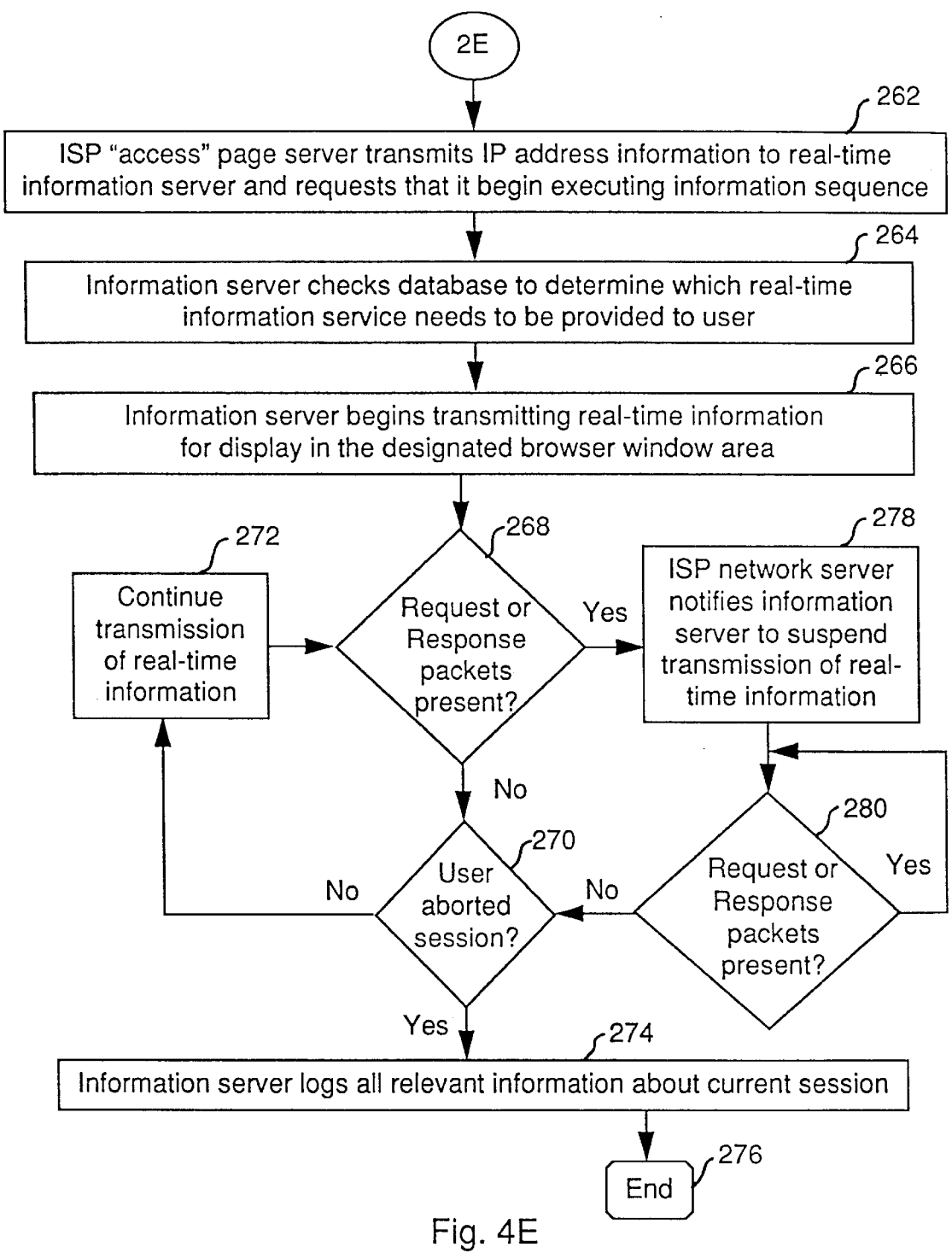

Referring now to FIG. 4D, if at step 250, the advertising timing option is enabled, then execution proceeds to step 258. At step 258, according to the advertising timing option, the announcement server 30 determines if the display time (i.e., the time an advertisements is played/displayed) exceeds a predetermined time limit. If the predetermined time limit has not been exceeded, then the announcement server 30 continues playing/displaying of the current advertisements until the time limit has been reached or exceeded. Once the predetermined time limit has been exceeded, as determined at step 258, then at step 260, the announcement server 30 checks to determine if the user has aborted the session. If the user has aborted the session, the announcement server 30 executes the logout procedure at step 142 (FIG. 3D). If the user has not aborted the session, as determined at step 260, then the announcement server 30 returns to step 232 (FIG. 4B), and checks its database for further appropriate advertising messages to be transmitted to the DTE 14.

If the advertising timing option is not enabled, then at step 252, the announcement server 30 determines if the user has aborted the session. If the user has aborted the session, the announcement server 30 executes the logout procedure at step 142 (FIG. 3D), and if the user has not aborted the session, the announcement server 30 returns to step 224 to begin executing a new advertising sequence.

If at step 248, it was determined that the advertising transmission was not yet complete, then at step 254, the announcement server 30 determines if the user has aborted the session. If the user has aborted the session, then the announcement server 30 executes the logout procedure at step 142. If the user has not aborted the session, then the announcement server 30 continues to transmit advertising messages, as indicated at step 256 and continues transmitting messages until either the transmission of messages is complete, as determined at step 248, or until the user has aborted the session, as determined at step 254.

Referring now to FIG. 4E, if at step 222, the user selected real-time information service, then at step 262, the modified network server software 24 transmits IP address information to the real-time information server 36 and signals the real-time information server 36 to begin executing an information sequence. At step 264, the information server 36 checks the database 38 to determine which real-time information service to provide to the user. At step 266, the information server 36 begins transmitting real-time information to the modified network server software 24 for display in the fixed announcement window 76. At step 268, either the modified network server software 24 or alternatively the modified network server software 24 in conjunction with the FEP 28, checks to determine if a request or a response packet has been transmitted from the host computer 12. If a request or response packet has not been transmitted from the host computer 12, then the modified network server software 24 checks to determine if the user has aborted the present session at step 270. If the user has not aborted the session, then the information server 36 continues to transmit real-time information to the modified network server software 24 at step 272. However, if the user has aborted the session, then at step 274, the information server 36 logs or records all relevant information pertaining to the current session and terminates processing at step 276.

If at step 268, a request or response packet is present, then at step 278, the modified network server software 24 notifies the information server 36 to suspend transmission of real-time information to the DTE 14 so that the response packets may be transmitted to the DTE 14. The response packets are transmitted to the DTE 14 by way of the connection path 20 until there are no more response packets present (step 280). When there are no more request or response packets present, step 270 is executed. Step 270 checks to determine if the user has aborted the session. If the user has not aborted the session, the real-time information server 36 continues the transmission of real-time information, as indicated at step 272. Otherwise, if the user has aborted the session, then at step 274, the information server 36 logs or records all relevant information pertaining to the current session and terminates processing at step 276.

Referring now to FIGS. 5A–5E, the third method of displaying advertisements on the DTE 14 while the connection path 20 is idle is shown. According to the third embodiment, the user at the DTE 14 is executing a conventional browser client software program. Thus, in order to play/display advertisements on the DTE 14, a software executable module is downloaded from the NSP 16 to the DTE 14 when the DTE 14 connects to the NSP 16. The downloaded module, executing on the DTE 14, works in conjunction with the conventional browser client software program, to provide a fixed display window in which the advertisements may be displayed, which is in addition to the conventional browser display window.

Figure 8C:
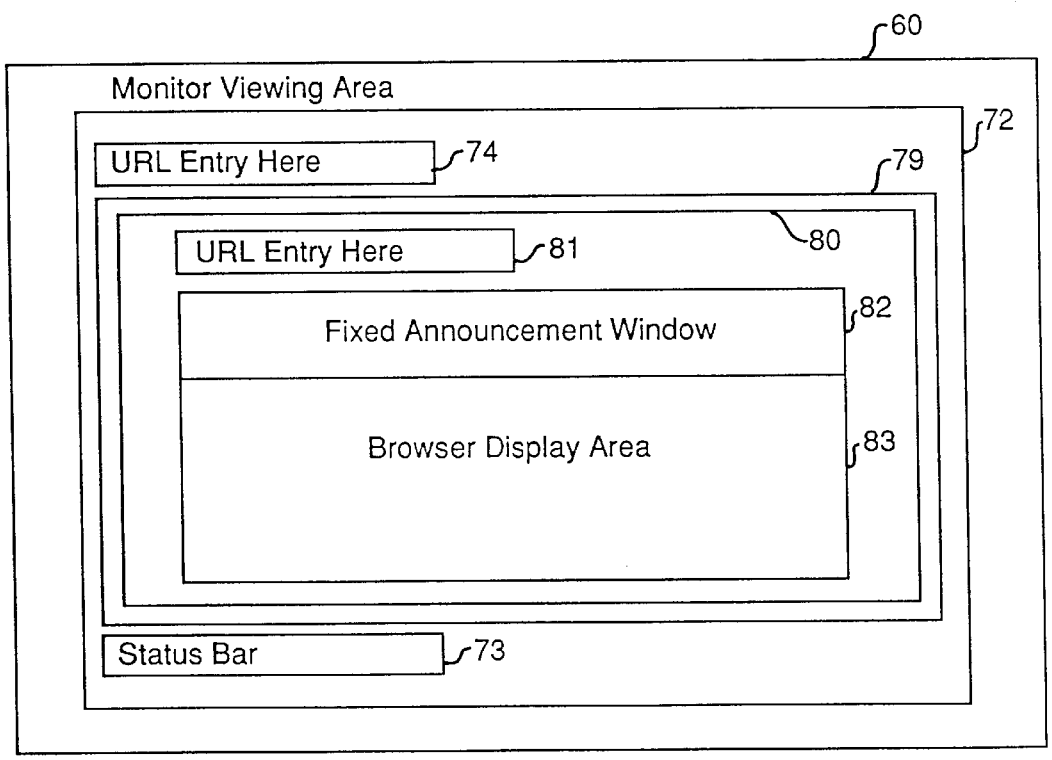

FIG. 8C shows the monitor viewing area 60 of the DTE 14. A standard browser client program executes on the DTE 14 and includes a conventional browser user interface 72 displayed on the monitor viewing area 60. The user interface 72 includes a conventional status bar 73, URL display area 74, and display window 79. The downloaded coded module provides a modified browser display 80 which is displayed within the conventional display window 79. The modified browser display 80 includes an URL entry area 81, a fixed announcement window 82 and a browser display area 83. The user at the DTE 14 accesses the computer network 10 by way of the NSP 16. However, with the downloaded code module executing on the DTE 14, the NSP 16 is able to transmit advertisements to the DTE 14 which are displayed in the fixed announcement window 82. Preferably, the browser display area 83 has a greater display area than the fixed announcement window 82. According to the present invention, preferably one or more advertisements are continually displayed in the fixed announcement window 82.

Figure 5A:
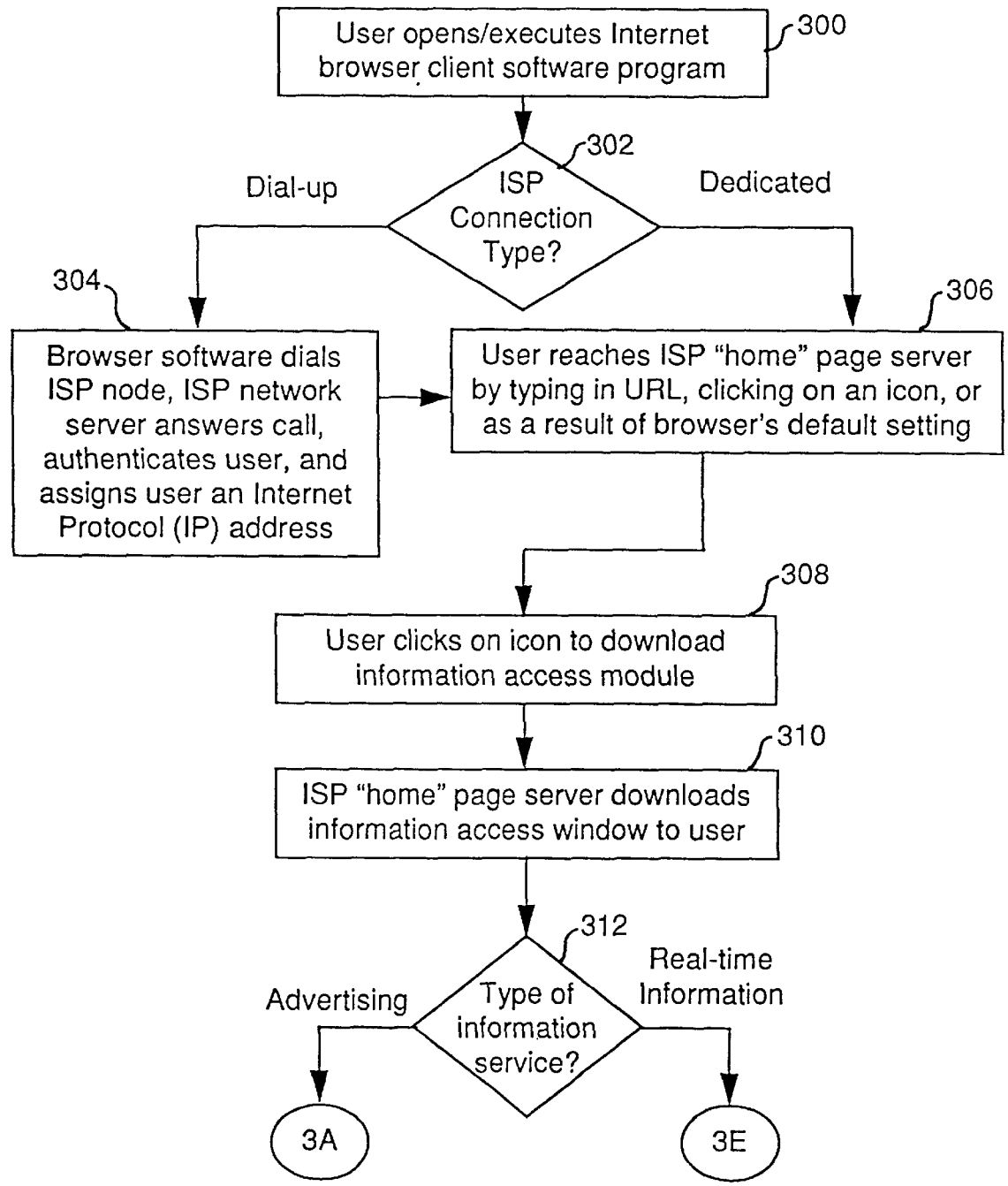
FIGS. 5A–5E are a flow diagram of a third preferred embodiment of the operation of the network communications system of FIG. 1.

Referring to now to FIG. 5A, beginning at step 300, a user at a first station or DTE 14 executes a conventional browser client software program. The conventional browser client software program initially determines the NSP connection type at step 302, as either a dial-up connection or a dedicated line connection. If the NSP connection type is a dial-up connection, then the browser client software program interacts with the modem 20 to establish a dial-up connection with the modified network server software 24 at step 304. The modified network server software 24 then answers the call, authenticates the user and assigns the user an IP address. The method then proceeds to step 306. Alternatively, if the NSP connection type is a dedicated line, as opposed to a dial-up connection, as determined at step 302, then the method skips step 304 and proceeds with step 306. At step 306, the user reaches the home page of the NSP 16 by entering a URL, clicking on an icon, or as a result of a browser default setting. The home page of the NSP 16, according to the third method includes a means for selecting an information access window. It is presently preferred that the means for selecting comprises an icon, however, it will be apparent to those of ordinary skill in the art that other means may be used, such as a hypertext link. At step 308, the user clicks on the icon, which instructs the modified network server software 24 to download an information access window code module to the DTE 14, and at step 310, the modified network server software 24 downloads the information access window code module to the DTE 14. With the information access window code module now operating on the DTE 14, the modified browser display 80 is displayed on the DTE 14.

Figure 5B:
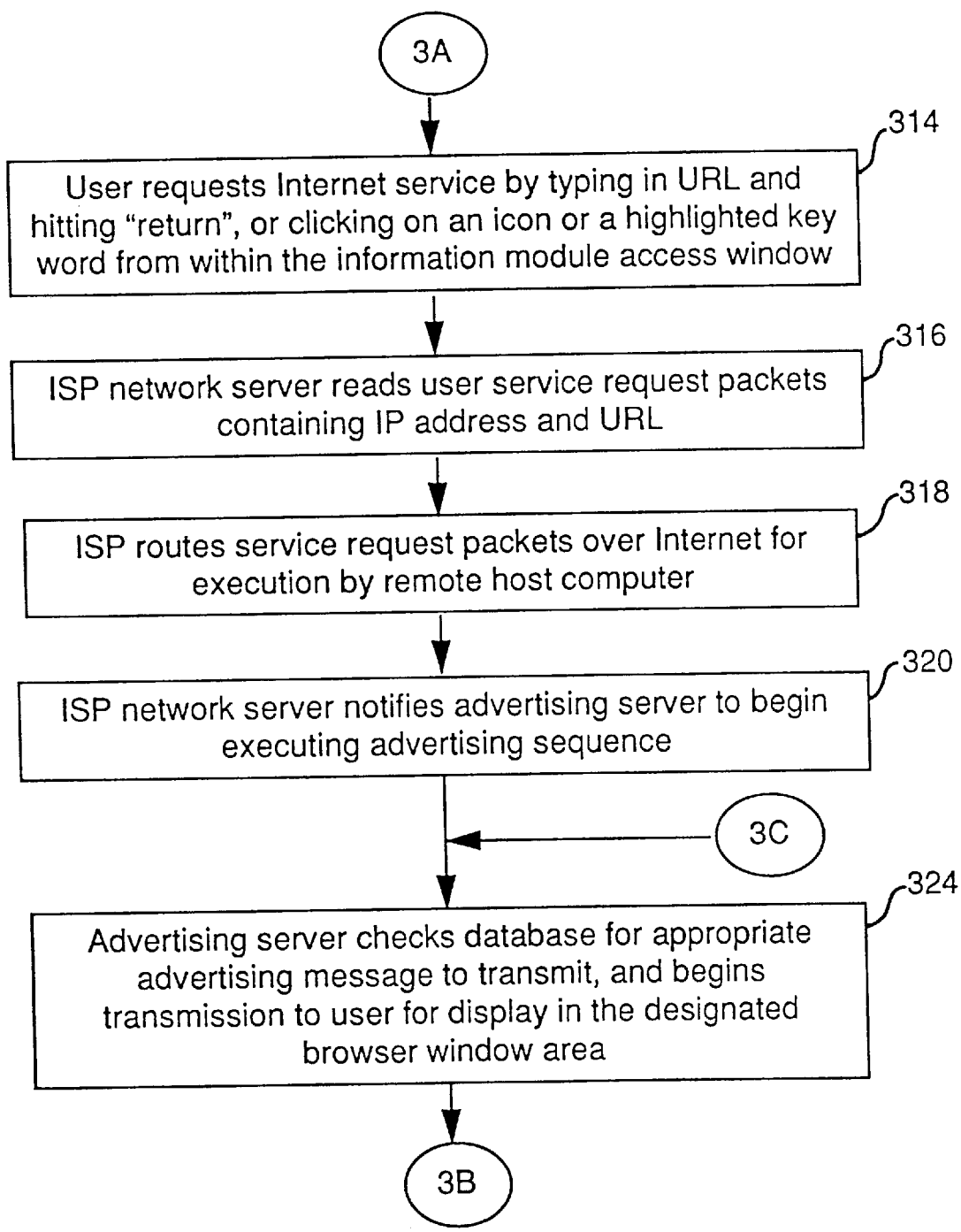

At step 312, the type of service desired, such as advertising service or real-time information service, is selected by the user at the DTE 14 by responding to a prompt or clicking on an icon. If real-time information service is requested, then the method proceeds to step 354 (FIG. 5E) and if advertising services are selected, then the method proceeds to step 314 (FIG. 5B).

At step 314, the user requests an Internet service from within the browser display area 83 in a conventional manner, such as by typing in a URL and entering return or clicking on an icon or a highlighted keyword, etc., which causes the DTE 14 to transmit a command to the modified network server software 24. At step 316, the modified network server software 24 reads the user's service request data packets. The service request packets include an IP address and/or an URL. At step 318, the modified network server software 24 routes the service request packets over the computer network 10 for execution by a remote host computer 12, as specified in the request packet. At step 320, the modified network server software 24 notifies the announcement server 30 to begin executing an advertising sequence. As with the first embodiment, the advertising sequence comprises playing/displaying at least one generally continuous advertising message or preferably, a sequence of advertisements which are repeatedly generated by the announcement server 30. At step 324, the announcement server 30 checks its database 32 to determine appropriate advertising messages to be transmitted to the user at the DTE 14 and begins transmitting messages to the user by way of the modified network server software 24, for display in the fixed announcement window 82 at the DTE 14.

Figure 5C:
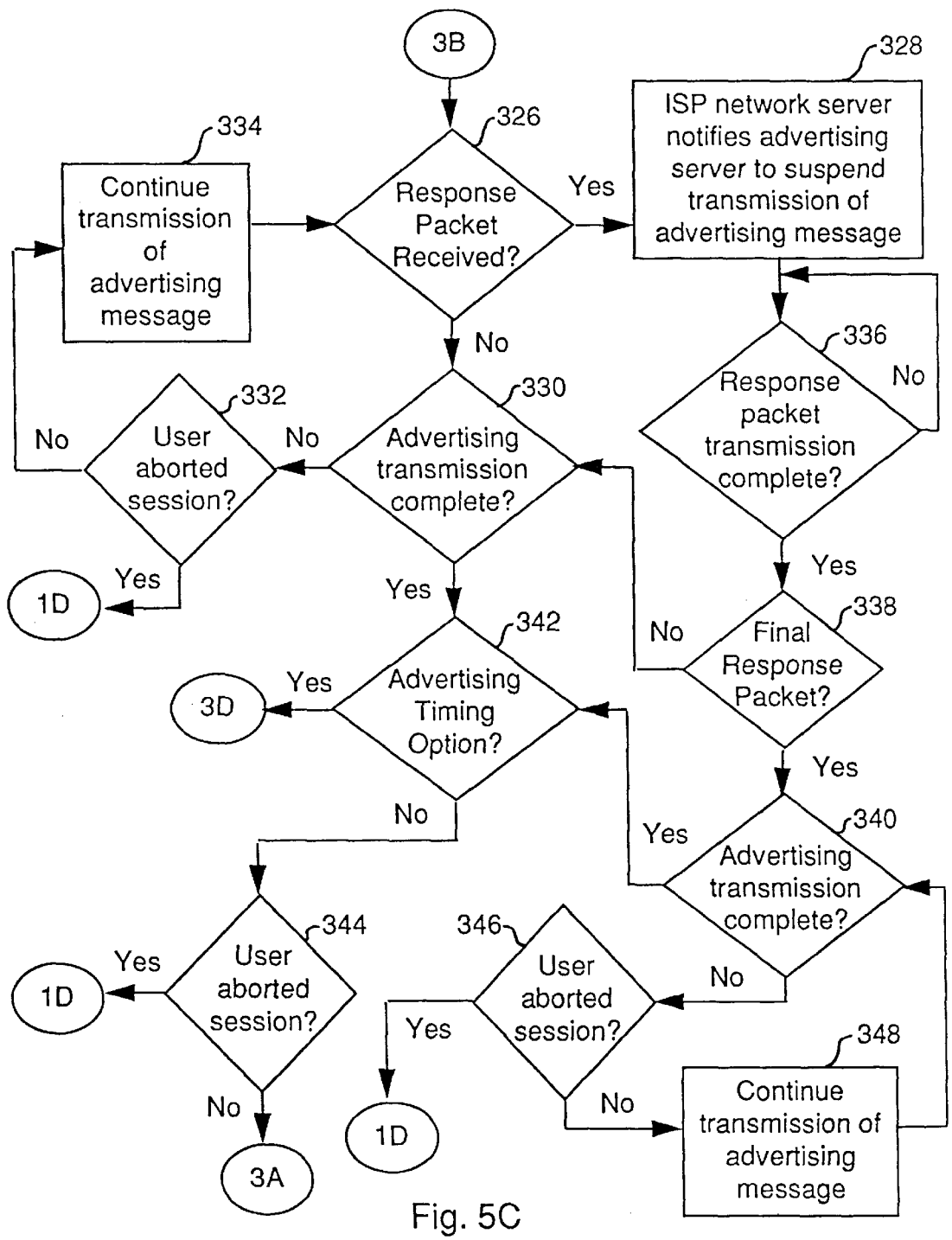

Proceeding now to FIG. 5C, preferably the advertising messages transmitted to the DTE 14 include an interaction means for permitting the user at the DTE 14 to respond to the advertising messages and interact with the announcement server 30. For instance, the user could initiate a predetermined response by entering a command in the fixed announcement window 82, such as by clicking on an icon or clicking on a highlighted field (i.e. hypertext, or text with a hyperlink). The user may also initiate an activity by way of the browser display area 83. When the user's network service request is completed, a response packet is transmitted to the modified network server software 24 by the remote computer 12, as is known by those of ordinary skill in the art. Either the modified network server software 24 or alternatively, the FEP 28 in conjunction with the modified network server software 24, signals the announcement server 30 that the connection path 20 is no longer idle, since the response packets need to be transmitted over the connection path 20 to the DTE 14. At step 326, the announcement server 30 checks to determine if such a response packet has been received. If a response packet has been received, the announcement server 30 branches to step 328 and if a response packet has not been received, execution proceeds with step 330.

Step 330 is reached if the connection path 20 is still idle. At step 330, the announcement server 30 checks to determine if the transmission of advertising messages to the DTE 14 is complete. If there are messages remaining to be transmitted to the DTE 14, at step 332, the announcement server 30 checks to determine if the user has aborted the session, such as by disconnecting from the NSP 16. If the user has not aborted the session, and the advertising transmission is not yet complete, the announcement server 30 continues to transmit messages to the modified network server software 24, which in turn passes the messages over the connection path 20 to the DTE 14 (step 334).

If the user aborted the session, as determined at step 332, then the announcement server 30 executes the logout procedure at step 142 (FIG. 3D), which logs or records all relevant information about the advertising messages that were transmitted to the DTE 14, stores such information in a database, and then finishes processing at step 116.

If at step 326 a response packet for the DTE 14 was detected, then at step 328, the modified network server software 24 notifies the announcement server 30 to suspend transmission of the advertising messages to the DTE 14. The modified network server software 24 then determines if the response packet transmission is complete at step 336. If the transmission is not complete, the modified network server software 24 waits until the response packet transmission is complete (loop on step 336), before executing step 338, which determines if a final response packet has been received. If a final response packet has not been received, the announcement server 30 executes step 330, as previously described. However, if a final response packet has been received, then at step 340, the announcement server 30 determines if the advertising transmission is complete.

If the transmission of advertising messages to the DTE 14 is complete as determined at either step 340 or step 330, then the announcement server 30 checks to determine if an advertising timing option is enabled, at step 342. As previously discussed, the advertising timing option allows advertisements to be played/displayed for a predetermined time period.

Figure 5D:
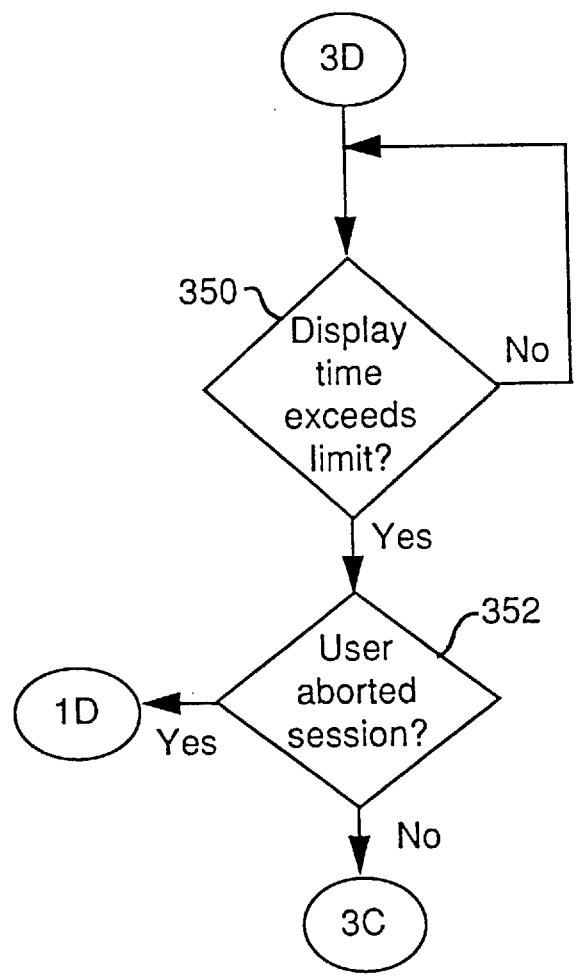

Referring now to FIG. 5D, if the advertising timing option is enabled, then the announcement server 30 determines if the display time (i.e., the time spent displaying messages on the DTE 14) exceeds a predetermined time limit (step 350). If the predetermined time limit has not been exceeded, the announcement server 30 continues to display the advertisement until the predetermined time limit is reached or exceeded. Once the predetermined time limit has been exceeded, then at step 352, the announcement server 30 checks to determine if the user has aborted the session. If the user has aborted the session, the announcement server 30 executes the logout procedure at step 142 (FIG. 3D). If the user has not aborted the session, then the announcement server 30 returns to step 324 (FIG. 5B), and checks its database for further appropriate advertising messages to be transmitted to the DTE 14.

If the advertising timing option is not enabled, then at step 344, the announcement server 30 determines if the user has aborted the session. If the user has aborted the session, the announcement server 30 executes the logout procedure at step 142, and if the user has not aborted the session, the announcement server 30 branches to step 314 to begin executing a new advertising sequence.

If at step 340, it was determined that the advertising transmission was not yet complete, then at step 346, the announcement server 30 determines if the user has aborted the session. If the user has aborted the session, the announcement server 30 executes the logout procedure at step 142. If the user has not aborted the session, then the announcement server 30 continues to transmit advertising messages (step 348) until either the transmission of messages is complete or until the user has aborted the session.

Figure 5E:
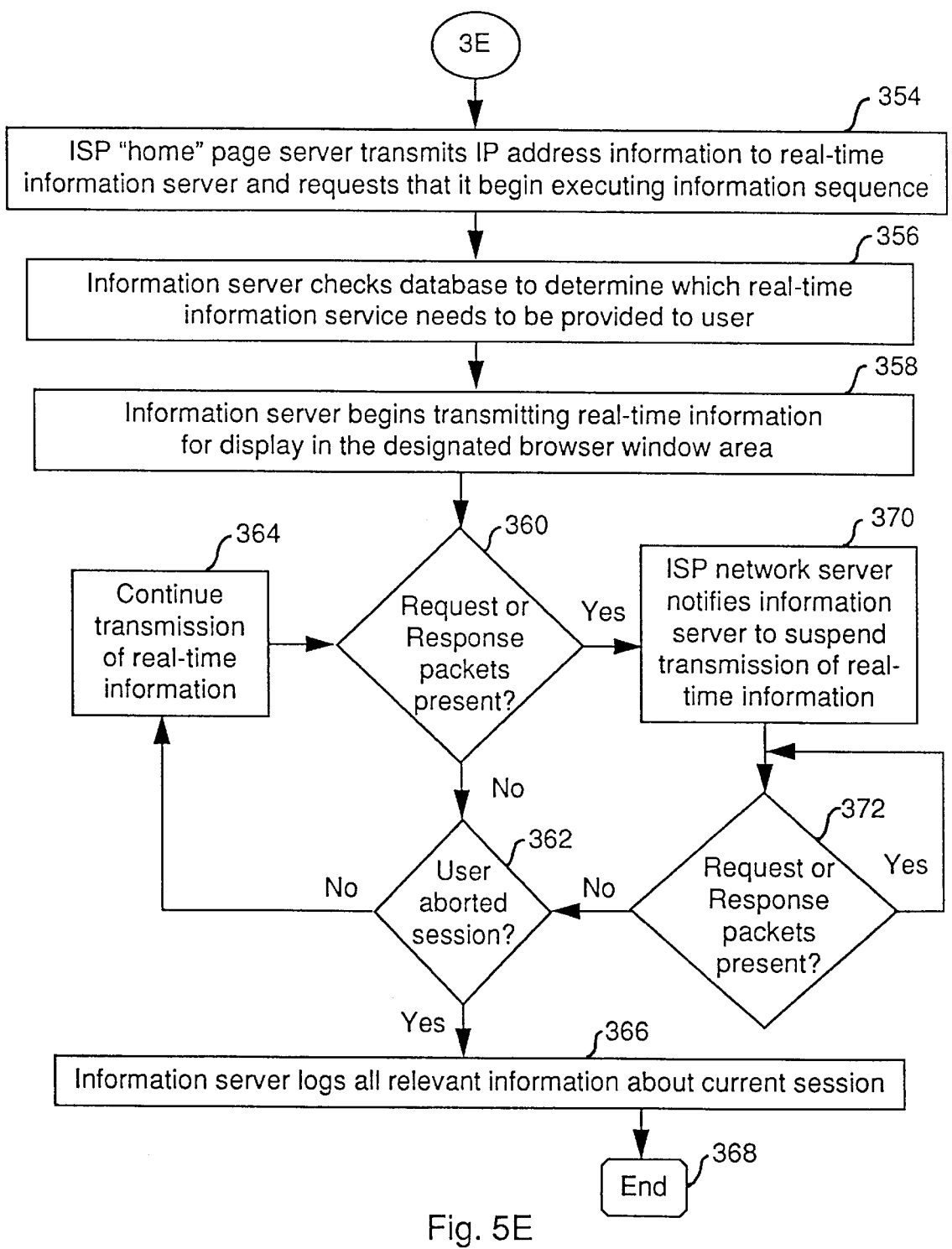

Referring now to FIG. 5E, if at step 312, the user selected real-time information service, then at step 354, the modified network server software 24 transmits IP address information to the real-time information server 36 and signals the real-time information server 36 to begin executing an information sequence. At step 356, the information server 36 checks the database 38 to determine which real-time information service to provide to the user (e.g. sports, finance, etc.) or the user may select a particular type of information. At step 358, the information server 36 begins transmitting real-time information to the modified network server software 24, which in turns transmits the information to the DTE 14 for display in the fixed announcement window 82. The modified network server software 24 or alternatively, the FEP 28 monitors the traffic destined for or generated by the DTE 24 to determine when the connection path 20 is idle. At step 360, the modified network server software 24 checks if there is any data to be transmitted to the DTE 14. If a request or response packet has not been transmitted from the computer 12, then the information server 36 checks to determine if the user has aborted the present session at step 362. If the user has not aborted the session, then the information server 36 continues to transmit real-time information to the DTE 14 by way of the modified network software 24 (step 364). However, if the user has aborted the session, then at step 366, the information server 36 logs or records all relevant information pertaining to the current session and terminates processing at step 368.

If at step 360, a request or response packet is detected, then at step 370, the modified network server software 24 notifies the information server 36 to suspend transmission of real-time information to the DTE 14 so that the response packets may be transmitted to the DTE 14. The response packets are transmitted to the DTE 14 by way of the connection path 20 until there are no more response packets present (step 372). When there are no more request or response packets present, step 362 is executed. Step 362 checks if the user has aborted the session. If the user has not aborted the session, the real-time information server 36 reinitiates the transmission of real-time information (step 364). Otherwise, if the user has aborted the session, then at step 366, the information server 36 logs or records all relevant information pertaining to the current session and terminates processing at step 368.

Referring now to FIGS. 6A–6E, the fourth method of playing/displaying advertisements on the DTE 14 while the connection path 20 is idle is shown. In the fourth embodiment, the user at the DTE 14 accesses the NSP 16 using a conventional browser client software program. The NSP 16 executes the modified network server software 24, which transmits advertisements to the DTE 14 when the connection path 20 is idle, with the advertisements being displayed in a transient display window on the DTE 14. That is, the transient window pops up on the display area of the DTE 14 whenever the advertisements are being transmitted to the DTE 14 and disappears whenever the connection path 20 is otherwise busy. By disappearing, the transient window is either no longer displayed on the DTE 14 or alternatively, the transient window is moved to or made a background window. If the transient window is made a background window, then the transient window is movable to the foreground upon entry of a predetermined command at the DTE 14, as is known by those of ordinary skill in the art.

Figure 8D:
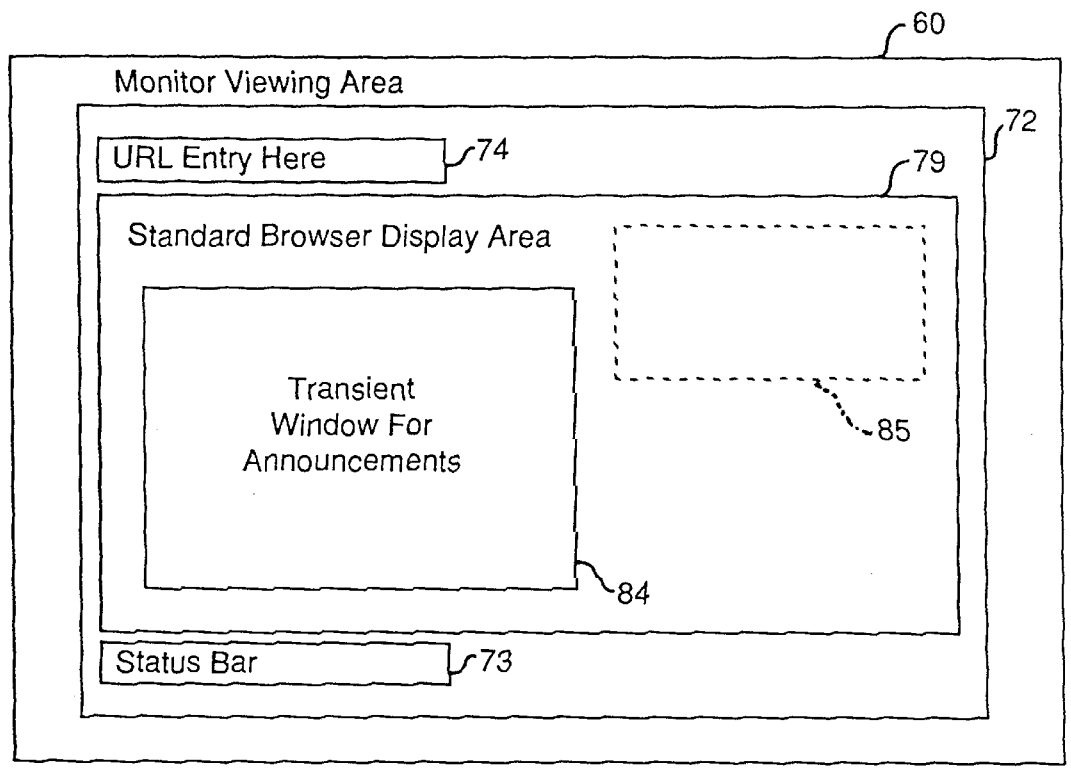

FIG. 8D shows the monitor viewing area 60 of the DTE 14. A standard browser client program executes on the DTE 14 and includes a conventional browser user interface 72 displayed on the monitor viewing area 60. The user interface 72 includes a conventional status bar 73, URL display area 74, and display window 79. A transient window 84 is preferably displayed in the display window 79 when the connection path 20 is idle and advertisements are being transmitted to the DTE 14. The advertisements are displayed in the transient window 84. As will be apparent to those of ordinary skill in the art, the transient window 84 may be placed anywhere within the user interface 72. For instance, an alternate location for displaying the transient window 84 appears in dashed lines at an upper right hand portion of the user interface 72 and is indicated at 85. The alternate transient window 85 covers a lesser portion of the display window 79 than the transient window 84. Locating the transient window 85 away from the display window 79 allows the user at the DTE 14 to view activity results or other data, without such information being blocked by the transient window 84. For instance, upon completion of a network search and after the search results have been downloaded to the DTE 14, the connection path 20 becomes idle. However, the user may be interested in viewing the search results prior to initiating another network activity. Accordingly, it may be advantageous to display the transient window 84 in a more obscure area of the user interface 72. Preferably one or more advertisements are continually displayed in the transient window 84.

Figure 6A:
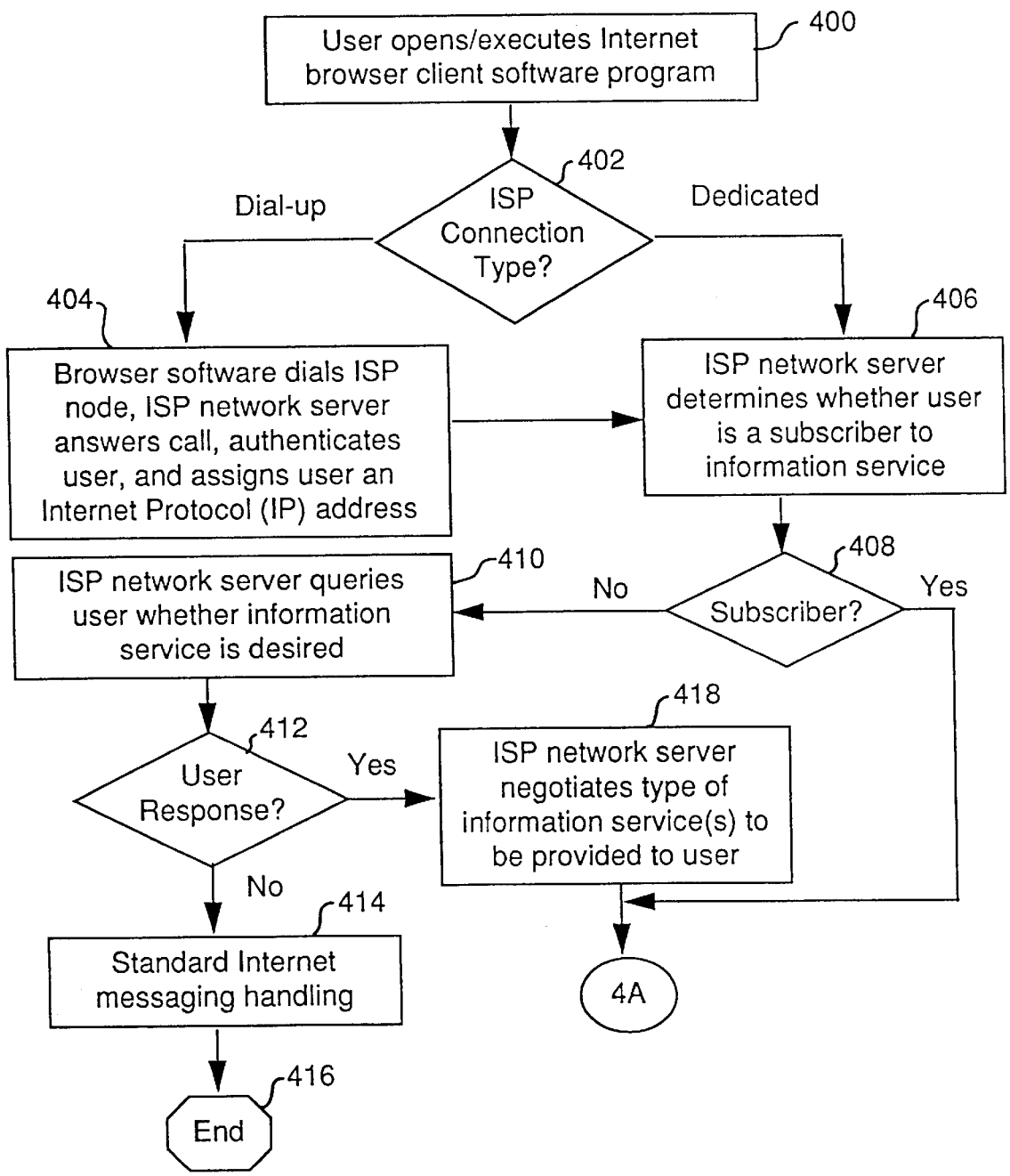
FIGS. 6A–6E are a flow diagram of a fourth preferred embodiment of the operation of the network communications system of FIG. 1.

Referring now to FIG. 6A, at step 400, a user at a first station or DTE 14 executes a conventional browser client software program. The browser client software program initially determines the NSP connection type at step 402, as either a dial-up connection or a dedicated line connection. If the NSP connection type is a dial-up connection, then the browser client software program interacts with the modem 20 to establish a dial-up connection with the NSP 16 at step 404. The modified network server software 24 answers the call, authenticates the user and assigns the user an IP address. The method then proceeds to step 406. Alternatively, if the NSP connection type is a dedicated line, as opposed to the dial-up connection, then the method skips step 404 and proceeds with step 406. At step 406, the modified network server software 24 determines whether the user is a subscriber to the information service of the present invention. At step 408, if the user is not a subscriber, then the method proceeds with step 410 and if the user is a subscriber, the method proceeds with step 420.

At step 410, the modified network server software 24 queries the user to determine if the user desires to become a subscriber to the information service. The modified network server software 24 may query the user by transmitting a query to the DTE 14, the query preferably includes a response field for allowing the user to easily respond to the query, by either entering a response using a keyboard, clicking on an icon, clicking on a highlighted field, or otherwise responding to the query in a manner known to those of skill in the art. At step 412, the user's response is determined and if the user answers the query in the negative, the method proceeds with step 414, in which case standard Internet message handling occurs such that the announcement server 30 does not interact with the DTE 14, as noted at step 416. If the user responds affirmatively to the query for information service, then at step 418, the modified network server software 24 negotiates a type of information service to be provided to the user, such as real-time information services or advertising services, described in more detail below.

At step 420, the user requests an Internet service, as is known by those of ordinary skill in the art, by typing in a URL and entering return or clicking on an icon, or clicking on a highlighted keyword, etc., from within the display window 79, which causes the DTE 14 to transmit a command to the modified network server software 24. At step 422, the modified network server software 24 reads the user's service request packets (data packets are formed by the browser client software program and transmitted to the network server software program as is known by those of ordinary skill in the art). The service request packets include an IP address and/or an URL. At step 424, the modified network server software 24 routes the service request packet over the computer network 10 for execution by a remote host computer 12, as specified in the request packet. At step 426, if an FEP 28 is connected for monitoring the traffic to/from the DTE 14, the FEP 28 informs the modified network server software 24 that the connection path 20 is idle, and the modified network server software 24 notifies the announcement server 30 to begin executing an advertising sequence. Alternatively, the modified network server software 24 monitors the traffic destined for or generated by the DTE 14. An advertising sequence is at least one generally continuous advertising message or preferably, a sequence of announcements which are repeatedly generated by the announcement server 30. At step 428, the announcement server 30 opens the transient information window 84 in the browser display window 79 on the DTE 14 and at step 430, the announcement server 30 checks its database 32 to determine appropriate advertising messages to be transmitted to the DTE 14. The announcement server 30 begins transmitting messages to the user by way of the modified network server software 24, for display in the transient window 84 on the DTE 14.

Figure 6B:
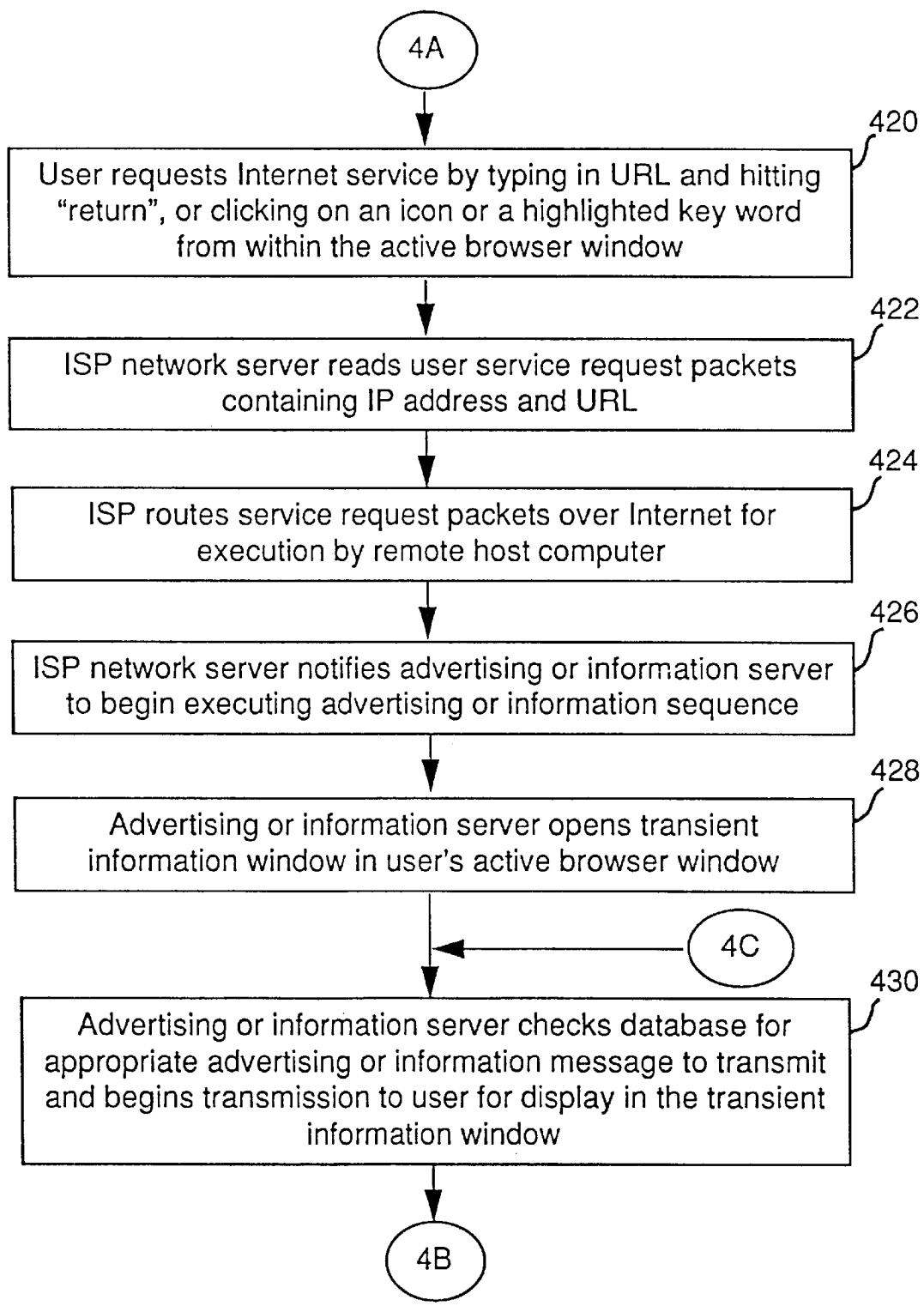
Figure 6C:
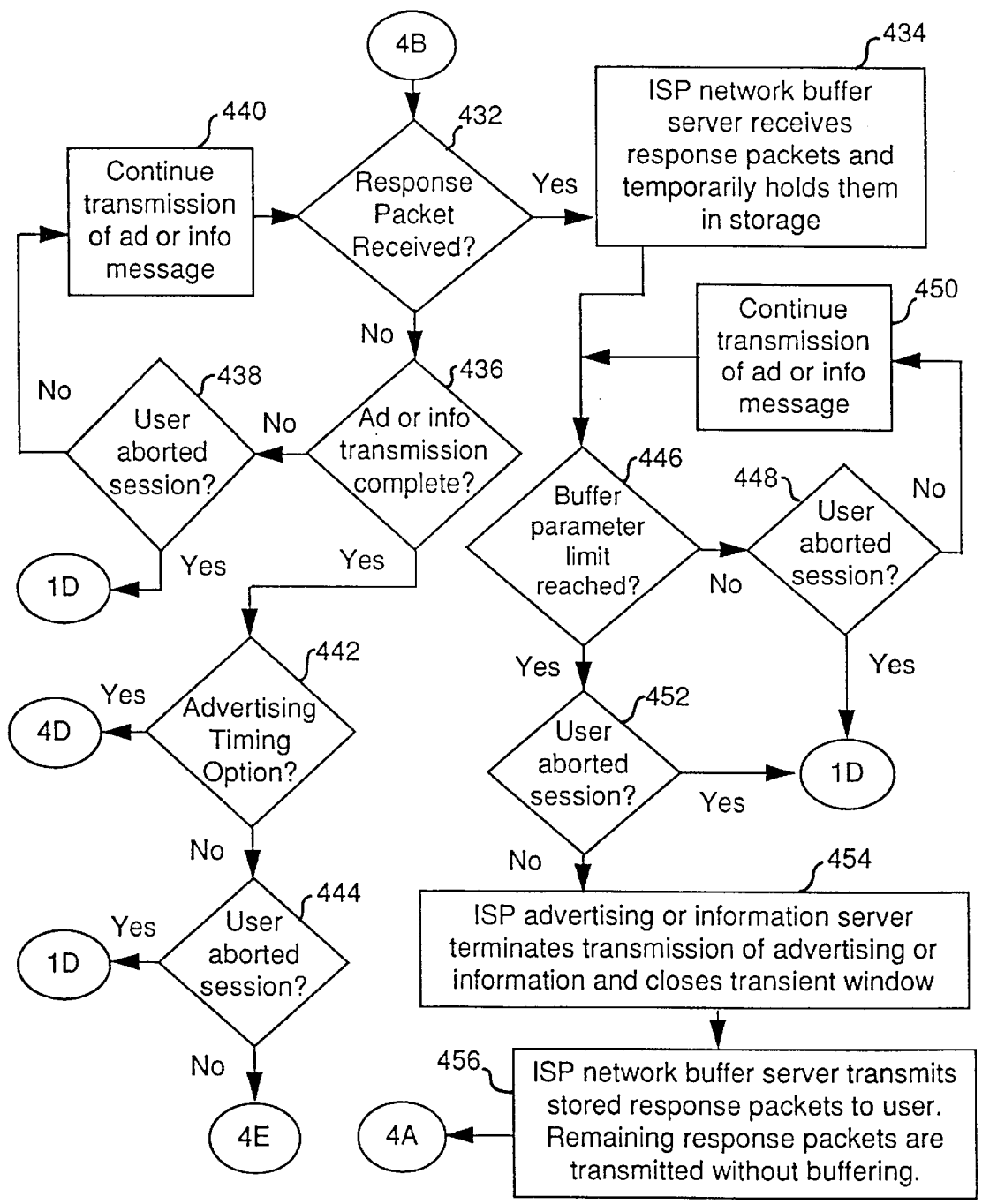

Proceeding now to FIG. 6C, preferably the advertising messages transmitted to the DTE 14 include an interaction means for permitting the user at the DTE 14 to respond to the advertising messages and interact with the announcement server 30, as previously discussed in relation to the other methods of the present invention. During processing or upon completion of the user's network service request, a response packet with the results of the user request is transmitted to the NSP 16. Either the modified network server software 24 of the FEP 28 monitors the traffic destined for the DTE 14 or generated by the DTE 14. If a response packet for the DTE 14 has been received, the modified network server software 24 branches to step 434 and if a response packet for the DTE 14 has not been received, execution proceeds with step 436. At step 436, the announcement server 30 checks to determine if the transmission of advertising messages to the DTE 14 is complete. If there are messages remaining to be transmitted to the DTE 14, at step 438, the announcement server 30 checks to determine if the user has aborted the session, such as by disconnecting from the NSP 16. If the user has not aborted the session, and the advertising transmission is not yet complete, the announcement server 30 continues to transmit messages to the DTE 14 at step 440.

If the user aborted the session, as determined at step 438, then at step 142 (FIG. 3D), the announcement server 30 executes the logout procedure, which logs or records all relevant information about the advertising messages that were transmitted to the DTE 14 and stores such information its database 32 or passes such information to the main controller 54, and then finishes processing at step 116.

If a response packet has been received by the NSP 16, as determined at step 432, then at step 434, the modified network server software 24 receives the response packets and buffers or temporarily stores the response packets in a buffer. A buffer parameter limit is checked at step 446 (e.g. the buffer is too small to store further packets without overwriting a prior packet). Buffering the response packets prior to transmitting the response packets to the DTE 14 allows the transient window 84 to remain open in the display area 79 for a longer period of time. However, once the buffer limit has been reached, the transient window 84 is closed and the buffered response packets are transmitted to the DTE 14. The response packet buffer is preferably limited in size so that the transmission of response packets to the DTE 14 is only suspended a very short period of time, for instance from between two to five seconds. However, it will be apparent to those of ordinary skill in the art that the size of the buffer could be made larger or smaller, or that the transmission of the response packets to the DTE 14 could be delayed/suspended for a predetermined period of time.

If the buffer parameter limit has not been reached, then at step 448 the announcement server 30 checks to determine if the user has aborted the session. If the user has not aborted the session, then at step 436, the announcement server 30 continues to transmit advertising messages to the DTE 14. However, if the user has aborted the session, then the announcement server 30 executes the logout procedure beginning with step 142 (FIG. 3D). The logout routine is also executed if the buffer parameter limit was reached, as determined in step 446 and the user aborted the session, as determined in step 452.

If the buffer parameter limit was reached (step 446) and the user has not aborted the session, then at step 454, the modified network server software 24 terminates transmission of the advertising messages to the DTE 14 and closes the transient window 84 on the DTE 14. Alternatively, the transient window 84 is made a background window, in which case the transient window 84 is movable to the foreground upon entry of a predetermined command at the DTE 14. Then, at step 456, the modified network server software 24 transmits the response packets stored in the buffer to the user and the remaining response packets are transmitted without being buffered by the modified network server software 24. The method then repeats beginning with step 420 (FIG. 6B).

If the advertising transmission is complete as determined at step 436, then the announcement server 30 checks to determine if an advertising timing option is enabled, at step 442. As previously discussed, the advertising timing option allows a time limit to be set for displaying advertising messages.

Figure 6D:
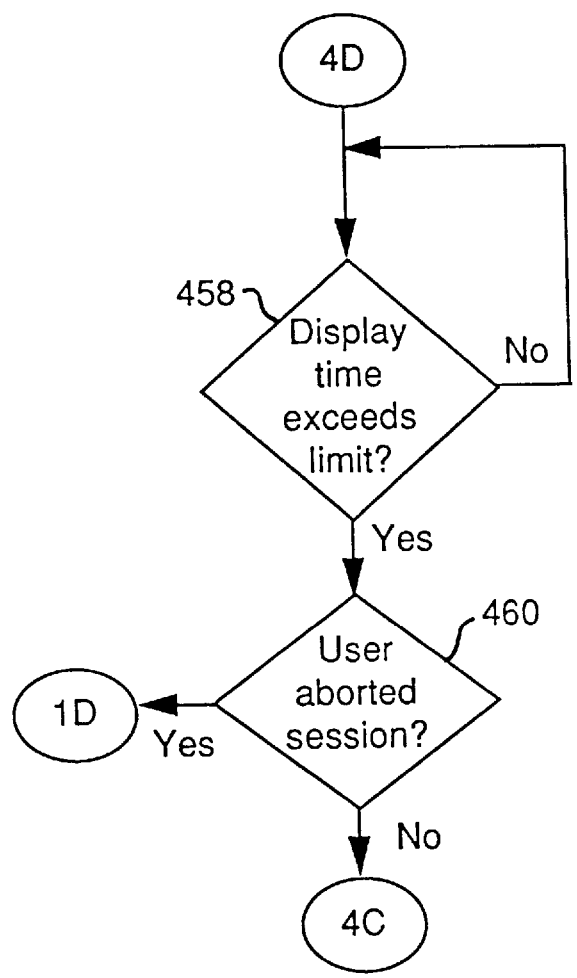

Referring now to FIG. 6D, if the advertising timing option is enabled, then execution proceeds to step 458. At step 458, the announcement server 30 determines if the display time (i.e., the time spent displaying a particular advertisement) exceeds a predetermined time limit. If the predetermined time limit has not been exceeded, the announcement server 30 continues to have the particular advertisements displayed on the DTE 14. If the predetermined time limit has been exceeded, then at step 460, the announcement server 30 checks to determine if the user has aborted the session. If the user has aborted the session, the announcement server 30 executes the logout procedure at step 142. If the user has not aborted the session, then the announcement server 30 returns to step 430 (FIG. 6B), and checks its database for further appropriate advertising messages to be transmitted to the DTE 14 and displayed in the transient window 84.

Referring again to FIG. 6C, if the advertising timing option is not enabled, then at step 444, the announcement server 30 checks if the user has aborted the session. If the user has aborted the session, the announcement server 30 executes the logout procedure at step 142, and if the user has not aborted the session, the announcement server 30 proceeds with step 462 (FIG. 6E).

Figure 6E:
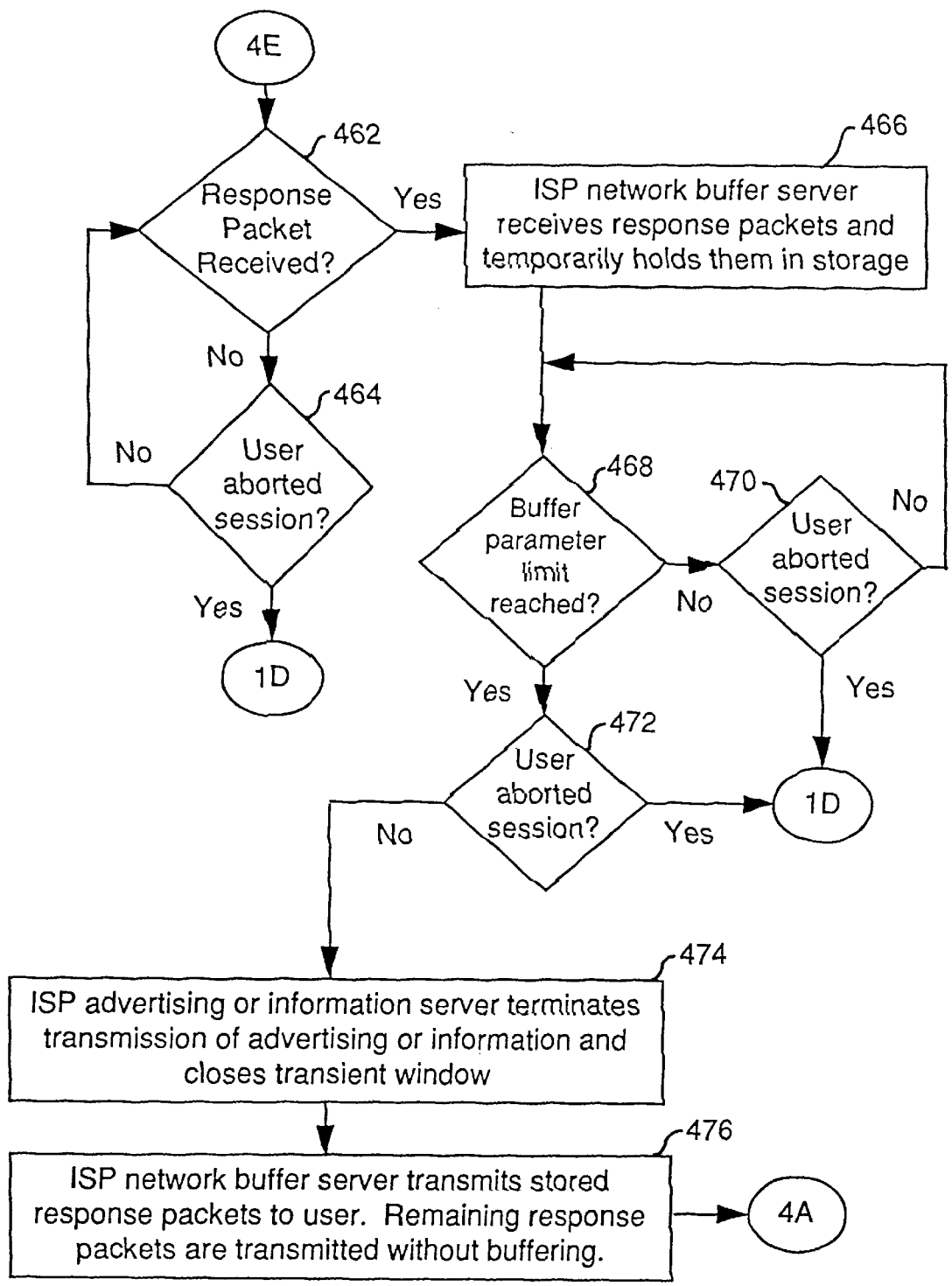

Referring now to FIG. 6E, at step 462, either the modified network server software 24 or alternatively the FEP 28, checks to determine if a request or a response packet for the DTE 14 has been received. If a request or response packet has not been received, then the announcement server 30 checks to determine if the user has aborted the present session at step 464. If the user has not aborted the session, then the announcement server 30 continues to effect the display of the advertisements on the DTE 14 until a response packet has been received. However, if the user has aborted the session, then step 464 branches to the logout procedure at step 142, and the announcement server 30 records all relevant information pertaining to the current session and terminates processing at step 116.

Alternatively, if at step 462 a request or response packet is present, then at step 466, the modified network server software 24 receives the response packets and buffers or temporarily stores the response packets. A buffer parameter limit is checked at step 468. If the buffer parameter limit has not been reached, then at step 470 the announcement server 30 checks to determine if the user has aborted the session. If the user has not aborted the session, then the modified network server software 24 continues to transmit and display advertisements in the transient window 84. However, if the user has aborted the session, then the announcement server 30 executes the logout procedure beginning with step 142 (FIG. 3D). The logout routine is also executed if the buffer parameter limit was reached, as determined in step 446 and the user aborted the session, as determined in step 472.

If the buffer parameter limit was reached, as determined in step 446, and the user has not aborted the session (step 472), then at step 474, the modified network server software 24 terminates transmission of the advertising messages to the DTE 14 and closes the transient information window on the DTE 14. At step 476, the modified network server software 24 transmits the response packets stored in the buffer to the DTE 14 and the remaining response packets are transmitted to the DTE 14 without being buffered by the modified network server software 24. The method then repeats beginning with step 420 (FIG. 6B).

Figure 7:
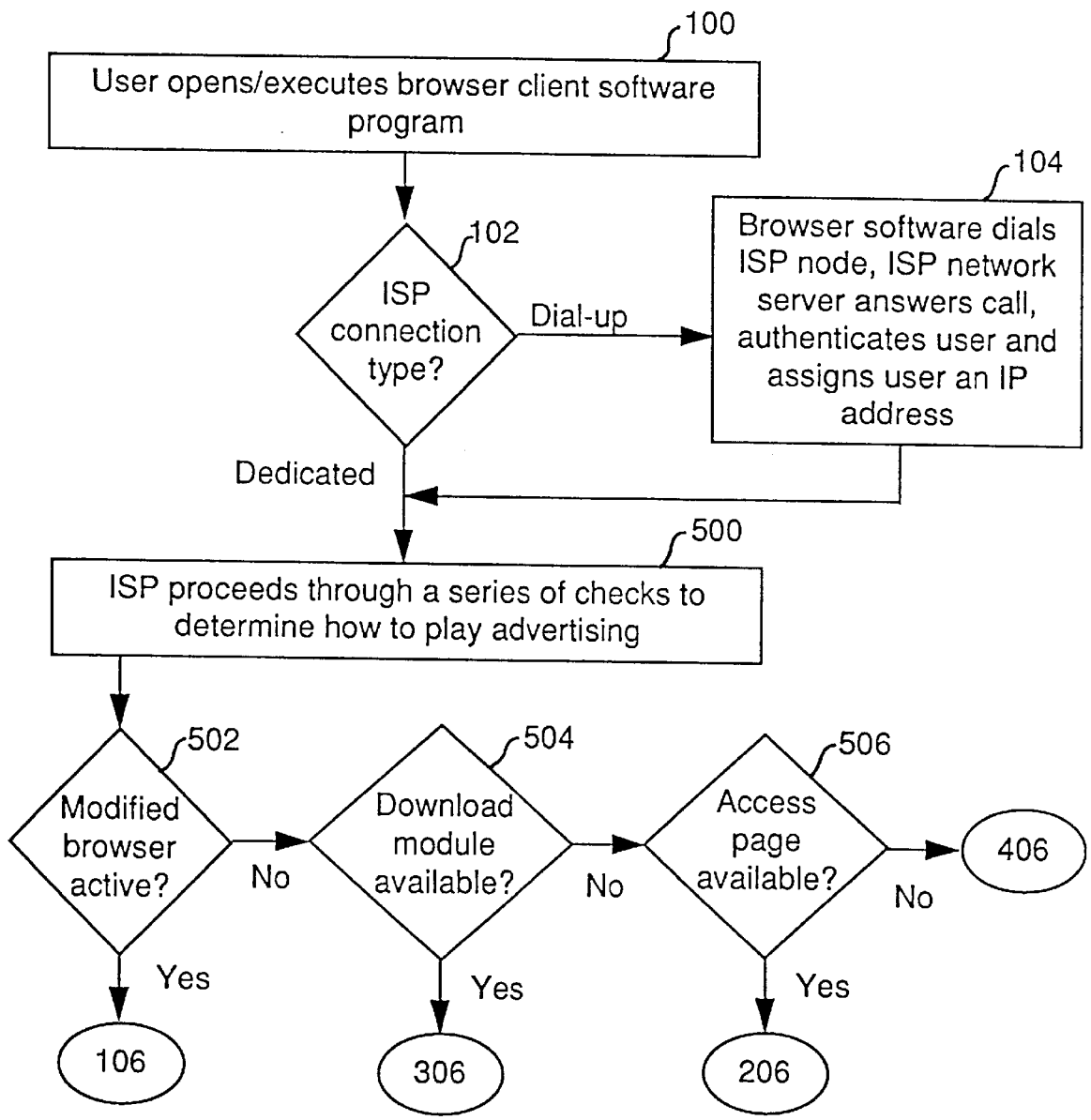
FIG. 7 is a flow diagram of the initial operation of the network communications system.

Referring now to FIG. 7, a flow diagram of the communications marketing system of the present invention is shown. The system allows advertisements to be displayed on the DTE 14 whenever the connection path 20 between the DTE 14 and the NSP 16 is idle, according to any one of the previously described methods. Beginning with steps 100–104, communications between a user at the DTE 14 and the modified network server software 24 at the NSP 16 are established. After communications have been established, at step 500 the modified network server software 24 performs a series of tests to determine the particular method by which advertisements will be displayed at the DTE 14. At step 502, the modified network server software 24 probes or queries the browser client software program operating on the DTE 14 to determine if the DTE 14 is executing the modified browser client software program 26. If the modified browser client software program 26 is executing on the DTE 14, then the system displays advertisements on the DTE 14 according to the first method by branching to step 106 (FIG. 3A). If the DTE 14 is not executing the modified browser client software program 26 then at step 504, the modified network server software 24 checks to determine whether the downloadable browser client code module is available and can operate on the DTE 14 in conjunction with the browser client software program on the DTE 14. If the downloadable code module is available and operable on the DTE 14 in conjunction with the browser client software, then the code module is downloaded to the DTE 14 by the modified network server software 24, and the modified network software 24 branches to step 306 (FIG. 5A). It is understood that not all DTEs are capable of having code downloaded and locally executed. For instance, certain DTEs may not include any or enough program memory space to accommodate the downloadable code module. In addition, the downloadable code module may not be compatible with a particular browser client program. Thus, if the downloadable code module is not available, at step 506, the modified network server software 24 checks if the access page method of displaying advertisements is available. If the NSP 16 is configured to provide access to the computer network 10 using an access page, the modified network server software 24 branches to step 206 (FIG. 4A). If the NSP 16 is not configured to communicate with the computer network 10 with an access page, then the modified network server software 24 branches to step 406 (FIG. 6A) and provides advertisements via the transient window method. The system of the present invention may thus include one or more of the alternative methods of providing advertising messages to a user at the DTE 14.

From the foregoing description, it can be seen that the present invention comprises a communications marketing system incorporating selectively modified software which allows for transmission and display of a pre-recorded announcement at a data terminal equipment or other network terminating device preceding, during and subsequent to data communication requests over any communications network. It will be appreciated by those skilled in the art that changes could be made to the embodiments described above without departing from the broad inventive concept thereof. It is understood, therefore, that this invention is not limited to the particular embodiments disclosed but it is intended to cover all modifications which are within the scope and spirit of the invention as defined by the appended claims.

We claim:

1. A marketing system for displaying an announcement at a network terminating device connected to a communications network by way of a network service provider (NSP), the system comprising:
   browser client program including a display window executing on the network terminating device for allowing the network terminating device to communicate with other devices on the communications network, the NSP providing the network terminating device access to the communications network;
   a network server program operating on the NSP for handling communications with the network terminating device and other devices on the communications network;
   a connection path for connecting the network terminating device with the NSP and allowing communications therebetween;
   a traffic monitor for monitoring the connection path to determine when the connection path is idle, the connection path being idle when the network terminating device is not sending or receiving any information over the connection path; and
   an announcement server connected to the NSP for transmitting at least one announcement to the network terminating device by way of the NSP, wherein the network server program transmits the at least one announcement from the announcement server to the network terminating device when the connection path is idle as determined by the traffic monitor.

2. The system of claim 1 further comprising means for the network server program notifying the announcement server to begin executing an announcement sequence when the connection path is idle, whereby the at least one announcement is transmitted to the network terminating device.

3. The system of claim 2 further comprising means for the network server program notifying the announcement server to suspend the announcement sequence, thereby stopping the transmission of announcements to the network terminating device.

4. The system of claim 3 further comprising means for the network server program notifying the announcement server to reinitiate the announcement sequence, thereby reinitiating the transmission of announcements to the network terminating device.

5. The system of claim 2 wherein the network server program signals the announcement server to suspend the transmission of the at least one announcement when the connection path is busy.

6. The system of claim 1 wherein the browser client program comprises a fixed announcement window separate from the display window, the fixed announcement window displaying the at least one announcement.

7. The system of claim 1 wherein the at least one announcement is displayed in a transient window located within the display window of the browser client program when the connection path is idle.

8. The system of claim 7 wherein the transient window is removed from the display window when the connection path is busy.

9. The system of claim 7 wherein the transient window is made a background window which is movable to the foreground upon entry of a predetermined command at the network terminating device.

10. The system of claim 1 further comprising a browser client program code module which interacts with the browser client program for providing a fixed announcement window within the display window of the browser client program, wherein the at least one announcement is displayed in the fixed announcement window.

11. The system of claim 10 wherein the code module is downloaded to the network terminating device from the NSP.

12. The system of claim 1 wherein the NSF includes an access page for allowing the network terminating device to access the communications network, wherein the access page is displayed in the display window of the browser client program and wherein the access page includes a fixed announcement window for displaying the at least one announcement therein.

13. The system of claim 1 further comprising timing means for displaying the at least one announcement for a predetermined time span.

14. The system of claim 1 further comprising means for the NSP determining if a user operating the browser client program subscribes to the marketing system.

15. The system of claim 1 further comprising means for registering a user with the marketing system, including designating a service type including an announcement service and a real-time information service.

16. The system of claim 15 further comprising means for determining the NSP user service type.

17. The system of claim 1 further comprising means for recording statistics relating to the announcements transmitted to the network terminating device.

18. The system of claim 1 further comprising interaction means for permitting a user at the network terminating device to interact with the announcement server during the playing of the announcement by initiating a predetermined response.

19. The system of claim 1 wherein the announcement server determines the announcement to play based upon criteria established by the marketing system.

20. The system of claim 1 wherein the announcement comprises text, graphics, audio and video components.

21. The system of claim 1 wherein the announcement server includes storage means for digitally storing the at least one announcement.

22. The system of claim 1 wherein the announcement includes means for connecting to a remote device related to the announcement.

23. The system of claim 22 wherein the means for connecting to the remote device comprises a hyperlink.

24. The system of claim I further comprising means for buffering data destined for the network terminating device from a remote device such that the connection path remains idle, thereby allowing continuation of the transmission of the at least one announcement to the network terminating device.

25. The system as recited in claim 1 wherein the announcement server plays a sequence of announcements to the network terminating device and repeatedly generates additional announcements.

26. A marketing system according to claim 1 wherein connection path is idle when the network terminating device is not waiting for receipt of requested information from the communications network.

27. A marketing system according to claim 1 wherein the network server program transmits the at least one announcement from the announcement server to the network terminating device separately from requested information.

28. A marketing system for displaying an announcement at a network terminating device connected to a communications network by way of a network service provider (NSP), the network terminating device connected to the NSP by a connection path and executing a browser client program including a display window, the system comprising:

an announcement server connected to the NSP, the announcement server including a storage device for storing at least one announcement;

a network server program operating on the NSP for handling communications between the network terminating device and the NSP and between the NSP and the communications network; and a traffic monitor for monitoring the connection path to determine when the connection path is idle, the connection path being idle when the network terminating device is not sending or receiving any information over the connection path, wherein the network server program notifies the announcement server to begin executing an announcement sequence, whereby the announcement server transmits the announcement over the connection path to the network terminating device when the connection path is idle as determined by the traffic monitor.

29. The system of claim 28 further comprising means for the network server program notifying the announcement server to begin executing an announcement sequence when the connection path is idle, whereby the at least one announcement is transmitted to the network terminating device.

30. The system of claim 29 further comprising means for the network server program notifying the announcement server to suspend the announcement sequence, thereby stopping the transmission of announcements to the network terminating device.

31. The system of claim 30 further comprising means for the network server program notifying the announcement server to reinitiate the announcement sequence, thereby reinitiating the transmission of the announcement to the network terminating device.

32. The system of claim 30 wherein the network server program signals the announcement server to suspend the transmission of the at least one announcement when the connection path is busy.

33. The system of claim 28 wherein the announcement is displayed in a transient window within the display window of the browser client program operating on the network terminating device.

34. The system of claim 33 wherein the transient window is removed from the display window when the connection path is busy.

35. The system of claim 28 wherein the transient window is made a background window which is movable to the foreground upon entry of a predetermined command at the network terminating device.

36. The system of claim 28 further comprising:

a modified browser client program operating on the network terminating device, the modified browser client program including a fixed announcement window and a network communications window, wherein the announcement is displayed in the fixed announcement window by the modified browser client program.

37. The system of claim 28 wherein the announcement is displayed for a predetermined time period.

38. The system of claim 28 further comprising a browser client program code module stored in a storage device connected to the NSP, the code module being downloaded to the network terminating device from the NSP, wherein the code module interacts with the browser client program for providing a fixed announcement window within the display window of the browser client program, and the announcement is displayed in the fixed announcement window.

39. The system of claim 28 wherein the NSP includes an access page for allowing the network terminating device to access the communications network, wherein the access page is displayed in the display window of the browser client program and wherein the access page includes a fixed announcement window for displaying the announcement therein.

40. The system of claim 28 further comprising means for the NSP determining if a user operating the browser client program subscribes to the marketing system.

41. The system of claim 28 further comprising means for registering a user with the marketing system, including designating a service type including an announcement service and a real-time information service.

42. The system of claim 41 further comprising means for determining the NSP user service type.

43. The system of claim 28 further comprising means for recording statistics relating to the announcement transmitted to the network terminating device.

44. The system of claim 28 further comprising interaction means for permitting a user at the network terminating device to interact with the announcement server during the playing of the announcement by initiating a predetermined response.

45. The system of claim 28 wherein the announcement server determines the announcement to play based upon criteria established by the marketing system.

46. The system of claim 28 wherein the announcement comprises text, graphics, audio and video components.

47. The system of claim 28 wherein the announcement server includes storage means for digitally storing the at least one announcement.

48. The system of claim 28 wherein the announcement includes means for connecting to a remote network device related to the announcement.

49. The system of claim 48 wherein the means for connecting to the remote network device comprises a hyperlink.

50. The system of claim 28 further comprising means for buffering data destined for the network terminating device from a remote device such that the connection path remains idle, thereby allowing continuation of the transmission of the announcement to the network terminating device.

51. A marketing system according to claim 28 wherein connection path is idle when the network terminating device is not waiting for receipt of requested information from the communications network.

52. A marketing system according to claim 28 wherein the network server program transmits the at least one announcement from the announcement server to the network terminating device separately from requested information.

53. A method for displaying an announcement at a network terminating device connected to a communications network by way of a network service provider (NSP), the method comprising the steps of:

providing a network server program operating on the NSP, the network server program handling communications between the network terminating device and the NSP and the NSP and the communications network;

providing an announcement server connected to the NSP and in communication with the network server program, the announcement server storing at least one announcement in a storage device thereof;

monitoring a connection path between the NSP and the network terminating device over which the network terminating device and the network server program communicate;

transmitting the announcement to the network terminating device when the connection path is idle as determined by the monitoring step, the connection path being idle when the network terminating device is not sending or receiving any information over the connection path; and displaying the announcement in a fixed announcement window on the network terminating device.

54. The method of claim 53 further comprising the step of: the network server program notifying the announcement server to begin executing an announcement sequence when the connection path is idle.

55. The method of claim 54 further comprising the step of the network server program notifying the announcement server to suspend the announcement sequence, thereby stopping the transmission of announcements to the network terminating device.

56. The method of claim 55 further comprising the step of the network server program notifying the announcement server to reinitiate the announcement sequence after the announcement sequence has been suspended and upon the connection path being idle, thereby reinitiating the display of announcements on the network terminating device.

57. The method of claim 54 wherein the network server program signals the announcement server to suspend the transmission of the at least one announcement when the connection path is busy.

58. The method of claim 53 further comprising the step of: operating a browser client program on the network terminating device for allowing the network terminating device to communicate with the network server program, wherein the browser client program comprises a fixed announcement window for displaying the announcement and a display window.

59. The method of claim 53 wherein the announcement is displayed in a transient window when the connection path is idle, the transient window located within a display window of a browser client program operating on the network terminating device.

60. The method of claim 59 further comprising the step of removing the transient window from the display window when the connection path is busy.

61. The method of claim 59 further comprising the step of moving the transient window to a background window, whereby the transient window is movable to the foreground upon entry of a predetermined command at the network terminating device.

62. The method of claim 53 further comprising the step of downloading a browser client program code module to the network terminating device, wherein the code module interacts with a browser client program operating on the network terminating device for providing a fixed announcement window within a display window of the browser client program, wherein the announcement is displayed in the fixed announcement window.

63. The method of claim 53 further comprising the step of the NSP providing an access page for allowing the network terminating device to access the communications network, wherein the access page is displayed in a display window of a browser client program operating on the network terminating device, wherein the access page includes a fixed announcement window for displaying the announcement therein.

64. The method of claim 53 further comprising the step of displaying the announcement for a predetermined time span.

65. The method of claim 53 further comprising the step of recording statistics relating to the announcement transmitted to the network terminating device.

66. The method of claim 53 wherein the announcement includes interaction means for permitting a user at the network terminating device to interact with the announcement server during the playing of the announcement.

67. The method of claim 53 wherein the announcement server determines the announcement to play based on date and time.

68. The method of claim 53 wherein the announcement comprises text, graphics, audio and video components.

69. The method of claim 53 further comprising the step of buffering data destined for the network terminating device from the communications network such that the connection path remains idle, thereby allowing continuation of the transmission of the announcement to the network terminating device.

70. A method according to claim 53 wherein the connection path is idle when the network terminating device is not waiting for receipt of requested information from the communications network.

71. A method according to claim 53 wherein the network server program transmits the announcement from the announcement server to the network terminating device separately from requested information.

* * * * *

UNITED STATES PATENT AND TRADEMARK OFFICE
CERTIFICATE OF CORRECTION

PATENT NO. : 5,854,897  
DATED : December 29, 1998  
INVENTOR(S) : Clifford J. Radziewiez, et al.

Page 1 of 2

It is certified that error appears in the above-identified patent and that said Letters Patent is hereby corrected as shown below:

On the title page: Item [56], add the following references:

FOREIGN PATENT DOCUMENTS

| | | DOCUMENT NUMBER | | | | | PUBLICATION DATE | COUNTRY OR PATENT OFFICE | CLASS | SUBCLASS | TRANSLATION YES | NO |
|---|---|---|---|---|---|---|---|---|---|---|---|---|
| | 6 | 0- | 1 | 7 | 3 | 6 | 70 | 09/85 | Japan | | | | |
| | 6 | 0- | 1 | 9 | 1 | 3 | 62 | 09/85 | Japan | | | | |

OTHER DOCUMENTS

| | | |
|---|---|---|
| | OAG Electronic Edition, Dialog, 1986 | |
| | Nadine Godwin," Agency Funded by 3M, Set to Market Software", *Travel Weekly*, Oct. 13, 1986 | |
| | Nadine Godwin," Agency Dares to Launch Its Own Air Res. System", *Travel Weekly*, Vol. 45, No. 93, Oct. 23, 1986 | |
| | "Advisory: Price Warehouse Travel Management Services", Jan. 28, 1987, PR Newswire | |
| | "Price Waterhouse Announces Travel Management Services", Feb. 2, 1987, PR Newswire Press Release | |

UNITED STATES PATENT AND TRADEMARK OFFICE
CERTIFICATE OF CORRECTION

PATENT NO. : 5,854,897
DATED : December 29, 1998
INVENTOR(S) : Clifford J. Radziewiez, et al.

It is certified that error appears in the above-identified patent and that said Letters Patent is hereby corrected as shown below:

OTHER DOCUMENTS

| | | |
|---|---|---|
| | Laurie Berger, "Policy--Obedient Computer Picks Best Flights", Mar. 1986, Travel Weekly | |
| | "Avatar New Air Auditor Software Package", Apr. 11, 1986, PR Newswire Press Release | |
| | "Searching for the Lowest Fare", Volume 45, Travel Weekly, Oct. 31, 1986 | |
| | "Thomas Cook Travel Exclusive Agreement", PR Newswire, January 12, 1987 | |

Signed and Sealed this

Fourth Day of May, 1999

Attest:

Q. TODD DICKINSON

*Attesting Officer*  Acting Commissioner of Patents and Trademarks